United States Patent
Yi et al.

(10) Patent No.: US 9,526,057 B2
(45) Date of Patent: Dec. 20, 2016

(54) METHOD AND APPARATUS FOR CELL SWITCHING

(71) Applicant: LG ELECTRONICS INC., Seoul (KR)

(72) Inventors: Yunjung Yi, Seoul (KR); Byounghoon Kim, Seoul (KR); Joonkui Ahn, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 14/415,981

(22) PCT Filed: Jul. 26, 2013

(86) PCT No.: PCT/KR2013/006733
§ 371 (c)(1),
(2) Date: Jan. 20, 2015

(87) PCT Pub. No.: WO2014/017869
PCT Pub. Date: Jan. 30, 2014

(65) Prior Publication Data
US 2015/0146692 A1    May 28, 2015

Related U.S. Application Data

(60) Provisional application No. 61/676,335, filed on Jul. 27, 2012.

(51) Int. Cl.
*H04W 36/24* (2009.01)
*H04W 36/00* (2009.01)

(52) U.S. Cl.
CPC ......... *H04W 36/24* (2013.01); *H04W 36/0055* (2013.01)

(58) Field of Classification Search
CPC ........... H04W 74/002; H04W 72/0406; H04W 74/0833; H04W 74/006; H04W 24/10; H04W 74/008; H04W 56/001; H04W 28/00; H04W 36/0072; H04W 72/042; H04W 76/046; H04W 88/08; H04J 2011/0096; H04L 29/06319
See application file for complete search history.

(56) References Cited

U.S. PATENT DOCUMENTS

2011/0222502 A1*   9/2011   Aminaka ............. H04W 16/10
                                                                370/329
2011/0275394 A1   11/2011   Song et al.
(Continued)

FOREIGN PATENT DOCUMENTS

WO    WO 2010/081166 A2    7/2010

OTHER PUBLICATIONS

3GPP TR 36.819 V11.1.0 (Dec. 2011), "3rd Generation Partnership Project; Technical Specification Group Radio Access Network; Coordinated multi-point operation for LTE physical layer aspects (Release 11)", Technical Report, See pp. 7-14 and pp. 52-55.

*Primary Examiner* — Jung-Jen Liu
(74) *Attorney, Agent, or Firm* — Birch, Stewart, Kolasch & Birch, LLP

(57) ABSTRACT

Disclosed are a method and an apparatus for transmitting data. A cell switching method can comprise the steps of: allowing a primary (P)-cell base station to enable a first secondary (S)-cell; allowing the P-cell base station to receive channel state information from a second S-cell; allowing the P-cell base station to determine the second S-cell as a switching S-cell on the basis of the channel state information; allowing the P-cell base station to disable the first S-cell and enable the second S-cell.

8 Claims, 24 Drawing Sheets

(56) References Cited

U.S. PATENT DOCUMENTS

| | | | |
|---|---|---|---|
| 2012/0044812 A1* | 2/2012 | Hiddink | H04W 36/0044 370/241 |
| 2012/0083280 A1 | 4/2012 | Liu et al. | |
| 2012/0250520 A1* | 10/2012 | Chen | H04L 5/001 370/241 |
| 2012/0300715 A1* | 11/2012 | Pelletier | H04W 56/0005 370/329 |
| 2013/0028204 A1* | 1/2013 | Dinan | H04W 72/0453 370/329 |
| 2013/0046968 A1* | 2/2013 | Dinan | H04L 9/0637 713/150 |
| 2013/0077514 A1* | 3/2013 | Dinan | H04L 5/0057 370/252 |
| 2013/0114574 A1* | 5/2013 | Ng | H04W 56/0045 370/336 |
| 2013/0153298 A1* | 6/2013 | Pietraski | H04L 5/001 175/45 |
| 2013/0242851 A1* | 9/2013 | Dinan | H04W 74/006 370/312 |
| 2013/0258958 A1* | 10/2013 | Dinan | H04W 56/0045 370/329 |
| 2014/0071949 A1* | 3/2014 | Yang | H04W 56/0045 370/331 |
| 2014/0086221 A1* | 3/2014 | Davydov | H04W 4/06 370/336 |
| 2014/0112254 A1* | 4/2014 | Lindoff | H04W 74/002 370/328 |
| 2014/0126409 A1* | 5/2014 | Ahn | H04L 5/0007 370/252 |
| 2014/0161110 A1* | 6/2014 | Kim | H04L 5/001 370/336 |
| 2014/0192663 A1* | 7/2014 | Rosa | H04W 52/244 370/252 |
| 2014/0198729 A1* | 7/2014 | Bostrom | H04W 24/10 370/328 |
| 2015/0181570 A1* | 6/2015 | Sorrentino | H04W 72/1205 370/329 |

* cited by examiner

METHOD AND APPARATUS FOR CELL SWITCHING

CROSS REFERENCE TO RELATED APPLICATIONS

This application is the National Phase of PCT International Application No. PCT/KR2013/006733, filed on Jul. 26, 2013, which claims priority under 35 U.S.C. 119(e) to U.S. Provisional Application No. 61/676,335, filed on Jul. 27, 2012, all of which are hereby expressly incorporated by reference into the present application.

BACKGROUND OF THE INVENTION

Field of the Invention

The present invention relates to wireless communications, and more particularly, to a method for cell switching.

Related Art

An intensive research has been conducted for improvements on the performance of the long term evolution release 12 (LTE release 12) in such aspects like capacity, transmission, coverage, and coordination between cells and cost. In order to improve the performance of the LTE release 12, it is now under discussion to introduce a variety of technologies such as a small cell enhancement, a macro cell enhancement, a new carrier type, a machine type communication and so on in a technical aspect.

The improvements on capacity and coverage that the LTE release 12 is aimed at may be realized by the small cell enhancement based on in an inter-site carrier aggregation, the integration between LTE wireless local area networks (LTE-WLAN) and the macro cell enhancement. Assuming the case that the size of cells gets small, inter-cell movements of a user equipment are frequently occurred and an amount of traffic that is signaled when the user equipment moves becomes increased. In order to solve the problem, in LTE release 12, a method has been discussed to optimize the small cell by decreasing signaling that is transmitted form a radio access network (RAN) to a core network based on the small cell enhancement.

Also, the new carrier type (NCT) that has been discussed in LTE release 12 is a newly defined frame type, which is different from a legacy frame configuration. The NCT is a carrier type that is optimized for the small cell, and may be applied for a macro cell as well. For example, the NTC may reduce the overhead that is occurred by transmitting a reference signal such as a cell-specific reference signal (CRS), and demodulate a downlink control channel based on a demodulation reference signal (DM-RS). By newly defining the NCT, the energy of a base station can be saved and the interference that is occurred in the heterogeneous network (HetNet) can be decreased. Additionally, it is able to reduce the reference signal overhead occurred when transmitting data with multiple downlink antennas by using the NCT. To be more specific, the NCT maintains the existing frame structures (for example, a length of CP, a subframe structure, a duplexing mode, etc.) but the control channel and/or the reference signal may be newly defined.

SUMMARY OF THE INVENTION

The present invention provides a method for cell switching.

The present invention also provides an apparatus for performing cell switching.

A method for cell switching according to an aspect of the present invention to accomplish the object of the present invention described above includes activating a first secondary (S)-cell by a base station of a primary (P)-cell, receiving channel state information from a second S-cell by the base station of the P-cell, determining the second S-cell as a switching S-cell based on the channel state information by the base station of the P-cell, and deactivating the first S-cell and activating the second S-cell by the base station of the P-cell, wherein the first S-cell and the second S-cell are included in an S-cell group, wherein the S-cell group is a set of a plurality of S-cells in which an identical physical cell identifier is configured and operated based on an identical center frequency, wherein the channel state information includes information of a channel which is obtained by overhearing uplink data that a wireless device transmits to the first S-cell by the second S-cell, wherein the P-cell, the first S-cell and the second S-cell are cells that perform carrier aggregation, and wherein the first S-cell and the second S-cell are cells activated by the P-cell.

An apparatus for performing cell switching according to another aspect of the present invention to accomplish the object of the present invention described above includes a process and a radio frequency (RF) unit, wherein the processor is configured to perform process of activating a first secondary (S)-cell, receiving channel state information from a second S-cell, determining the second S-cell as a switching S-cell based on the channel state information, and deactivating the first S-cell and activating the second S-cell, wherein the RF unit receives the channel state information from the second S-cell, wherein the first S-cell and the second S-cell are included in an S-cell group, wherein the S-cell group is a set of a plurality of S-cells in which an identical physical cell identifier is configured and operated based on an identical center frequency, wherein the channel state information includes information of a channel which is obtained by overhearing uplink data that a wireless device transmits to the first S-cell by the second S-cell, wherein the P-cell, the first S-cell and the second S-cell are cells that perform carrier aggregation, and wherein the first S-cell and the second S-cell are cells activated by the P-cell.

The present invention may increase the performance of data transmission and reception.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, a terminal, a wireless terminal, etc. Also, the wireless device may be a device that supports data communication only such as a machine-type communication device.

A base station (BS) is generally a fixed station that communicates with the wireless device and may be referred to as another terminology, such as an evolved Node-B (eNB), a base transceiver system (BTS), an access point, etc.

Hereinafter, it will be introduced that 3rd generation partnership project (3GPP) long term evolution (LTE) defined based on each release of 3GPP technical specification (TS) or operations of a wireless device and/or a BS in 3GPP LTE-A. Also, the present invention may be applied to various wireless communication network instead of 3GPP LTE/3GPP LTE-A. Hereinafter, LTE includes LTE and/or LTE-A.

Figure 1:
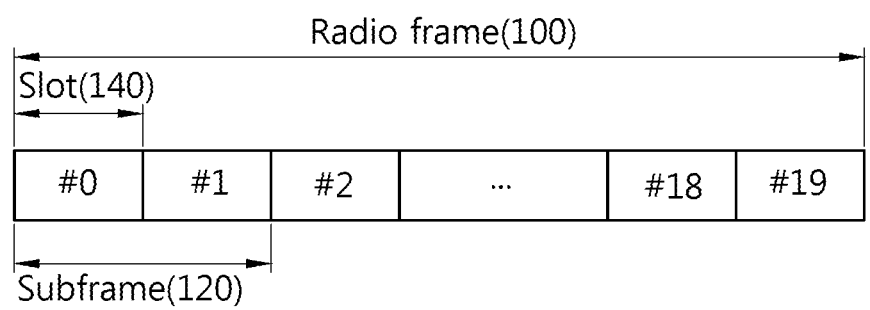
FIG. 1 shows the structure of a radio frame in 3GPP LTE.

FIG. 1 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008 March).

Referring to FIG. 1, the radio frame includes 10 subframes 120, and one subframe includes two slots 140. The radio frame may be indexed based on slot 140, that is, from slot #0 to #19 or may be indexed based on subframe 120, that is, from subframe #0 to subframe #9. For example, subframe #0 may include slot #0 and slot #1.

A time taken for transmitting one subframe 120 is called a transmission time interval (TTI). The TTI may be a scheduling basis for a data transmission. For example, a radio frame may have a length of 10 ms, a subframe may have a length of 1 ms, and a slot may have a length of 0.5 ms.

One slot 140 includes a plurality of orthogonal frequency division multiplexing (OFDM) symbols in a time domain and a plurality of subcarriers in a frequency domain. In LTE, a BS uses OFDMA as an access method in downlink channel. The OFDM symbols are used to express a symbol period, and may be called by other names depending on a multiple-access scheme. For example, in an uplink channel in which a wireless device transmits data to a BS, a single carrier-frequency division multiple access (SC-FDMA) may be used. The symbol section in which data is transmitted through uplink channel may be referred to as a SC-FDMA symbol.

The structure of radio frame 100 introduced in FIG. 1 is an embodiment for the frame structure. Accordingly, new radio frame format may be defined by changing the number of subframes 120, the number of slots 140 included in the subframe 120, or the number of OFDM symbols included in the slot 140.

In the radio frame structure, the number of symbols included in a slot may be changed depending on which cyclic prefix (CP) is used. For example, when the radio frame uses a normal CP, one slot may include seven OFDM symbols. When the radio frame uses an extended CP, one slot may include six OFDM symbols.

The wireless communication system may be divided into a frequency division duplex (FDD) scheme and a time division duplex (TDD) scheme. According to the FDD scheme, an uplink transmission and a downlink transmission may be performed based on different frequency bands. According to the TDD scheme, an uplink transmission and a downlink transmission may be performed based on the same frequency band by using time division scheme. A channel response of the TDD scheme is substantially reciprocal since it uses the same frequency band. That is, in TDD scheme, a downlink channel response and an uplink channel response are almost the same in a given frequency band. Thus, the TDD-based wireless communication system may obtain the channel state information from the channel state information of uplink channel. In the TDD scheme, the entire frequency band is time-divided for uplink and downlink transmissions, so a downlink transmission by the BS and an uplink transmission by the wireless device cannot be simultaneously performed.

Figure 2:
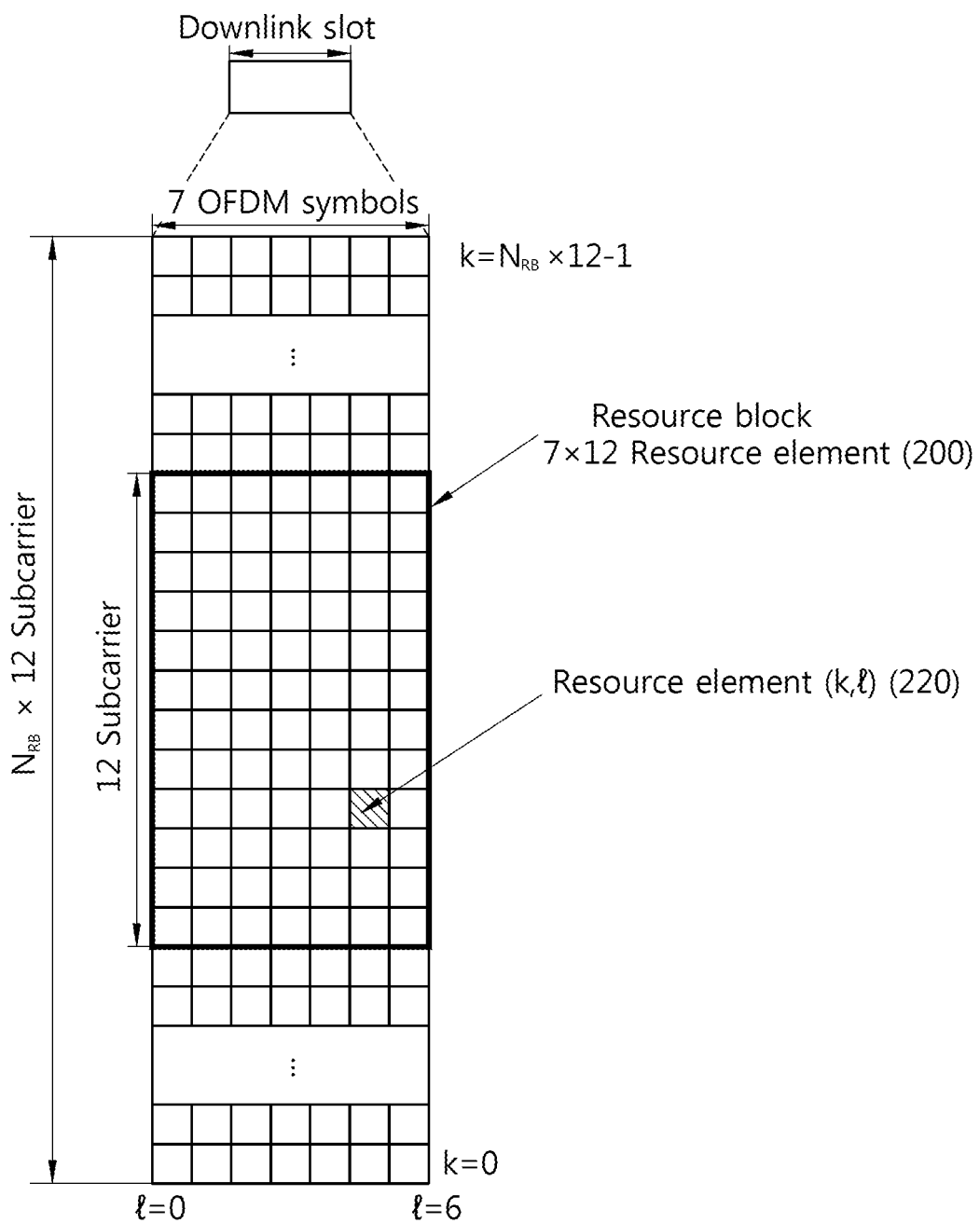
FIG. 2 shows an example of a resource grid of a downlink slot.

FIG. 2 shows an example of a resource grid of a downlink slot.

A downlink slot includes a plurality of OFDM symbols in the time domain and $N_{RB}$ number of resource blocks in the frequency domain. The $N_{RB}$ number of resource blocks included in the downlink slot may be determined depending upon a downlink transmission bandwidth which is configured in a cell. For example, in an LTE system, $N_{RB}$ may have any one value of 6 to 110 depending upon the transmission bandwidth which is used. One resource block 200 includes a plurality of subcarriers in the frequency domain. An uplink slot may have the same structure as that of the downlink slot.

Each element on the resource grid is called a resource element 220. The resource elements 220 on the resource grid can be discriminated by a pair of indexes (k, 1) in the slot. Here, k (k=0, . . . , $N_{RB}$×12−1) is a subcarrier index in the frequency domain, and l (l=0, . . . , 6) is an OFDM symbol index in the time domain.

Herein, one resource block 200 may include 7×12 resource elements made up of seven OFDM symbols in the time domain and twelve subcarriers in the frequency domain. Such a size is just an example, and the number of OFDM symbols and subcarriers constituting one resource block 200 may be changed. The resource block pair indicates a resource basis that includes two resource blocks.

As described above, the number of OFDM symbols in one slot may have different values depending on the CP. Also, the number of resource blocks included in one slot may be changed depending on the size of overall frequency bandwidth.

Figure 3:
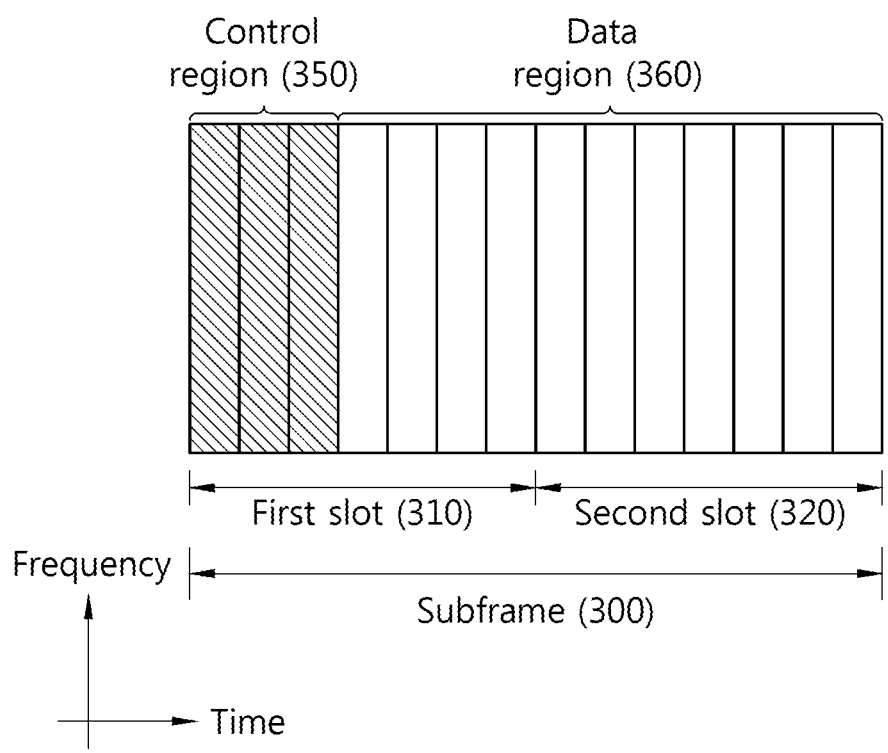
FIG. 3 shows the structure of a downlink subframe.

FIG. 3 shows the structure of a downlink subframe.

A downlink subframe 300 may be distinguished into two slots 310 and 320 base on the time domain. Each of the slots 310 and 320 includes seven OFDM symbols in the normal CP. A resource region that corresponds to first three OFDM symbols (maximum four OFDM symbols with respect to a 1.4 MHz bandwidth) of a first slot 310 in the subframe 300 may be used as a control region 350 to which control channels are allocated. The other remaining OFDM symbols may be used as a data region 360 to which a traffic channel such as a physical downlink shared channel (PDSCH) is allocated.

The PDCCH may be a control channel that transmits, for example, a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual wireless devices in a certain UE group, an activation of a voice over internet protocol (VoIP), and the like. A plurality of bases that transmits the PDCCH data may be defined in the control region 350. A wireless device may obtain control data by monitoring the plurality of bases that transmits the PDCCH data. For example, the PDCCH data may be transmitted to a wireless device based on one or an aggregation of a plurality of consecutive control channel elements (CCE). The CCE may be a basis of transmitting the PDCCH data. The CCE may include a plurality of resource element groups. The resource element group is a resource basis that includes four usable resource elements.

The BS determines a PDCCH format according to a DCI to be transmitted to the wireless device, and attaches a cyclic redundancy check (CRC) to the DCI. A unique radio network temporary identifier (RNTI) is masked on the CRC according to the owner or the purpose of the PDCCH. In case of a PDCCH for a particular wireless device, a unique identifier, e.g., a cell-RNTI (C-RNTI), of the wireless device, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information- RNTI (SI-RNTI), may be masked on the CRC. In order to indicate a random access response, i.e., a response to a transmission of a random access preamble of the wireless device, a random access-RNTI (RA-RNTI) may be masked on the CRC.

Figure 4:
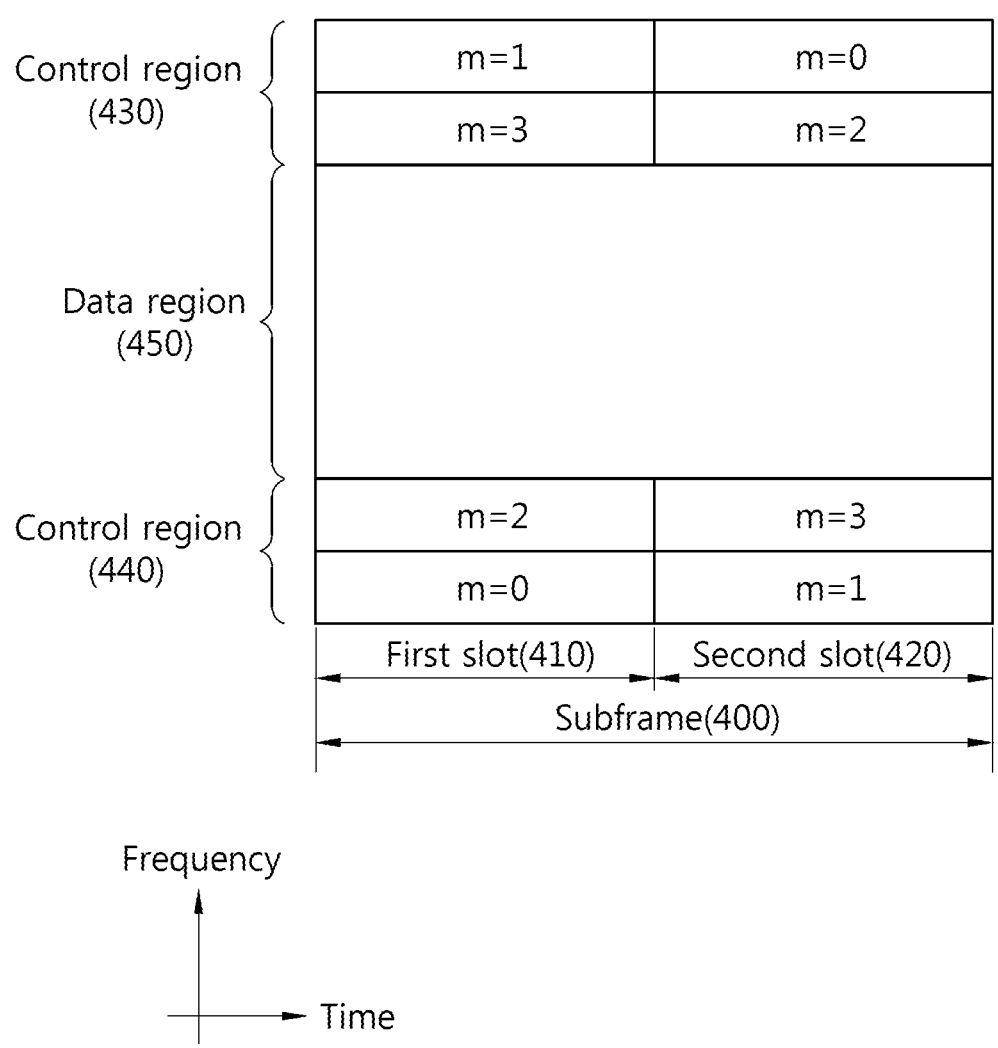
FIG. 4 shows the structure of an uplink subframe.

FIG. 4 shows the structure of an uplink subframe.

An uplink subframe may be divided into a control region 430 and 440 and a data region 450 based on the frequency domain. A physical uplink control channel (PUCCH) for transmitting uplink control information is allocated to the control region 430 and 440. A physical uplink shared channel (PUSCH) for transmitting data is allocated to the data region 450. When indicated by a higher layer, a wireless device may support a simultaneous transmission of the PUSCH and the PUCCH.

The PUCCH with respect to a wireless device may be allocated as a basis of a resource block (RB) pair in the subframe 400. The resource blocks belonging to the pair of resource blocks (RBs) may be allocated to different subcarriers in the first slot 410 and the second slot 420, respectively. The frequency occupied by the RBs belonging to the pair of RBs which are allocated to the PUCCH is changed based on a slot boundary. Such a PUCCH allocating method is called a frequency-hopped method. The wireless device may obtain a frequency diversity gain by transmitting uplink control information through different subcarriers according to time. In FIG. 4, m is a position index that indicates the logical frequency domain positions of the pair of RBs allocated to the PUCCH in the subframe.

The uplink control information transmitted on the PUCCH may include a hybrid automatic repeat request (HARQ) acknowledgement/non-acknowledgement (ACK/ NACK), a channel quality indicator (CQI) indicates the state of a downlink channel, a scheduling request (SR) which is a request for uplink radio resource allocation, and the like.

The PUSCH is a channel which is mapped to an uplink shared channel (UL-SCH), a transport channel. The uplink data transmitted on the PUSCH may be a transport block, which is a data block for the UL-SCH transmitted during the TTI. The transport block may include user information. Or, the uplink data may be multiplexed data. The multiplexed data are data obtained by multiplexing the transport block for the UL-SCH and control information. For example, the control information multiplexed to data may include a CQI, a precoding matrix indicator (PMI), a HARQ, a rank indicator (RI), and the like. Or, the uplink data may include only the control information.

Figure 5:
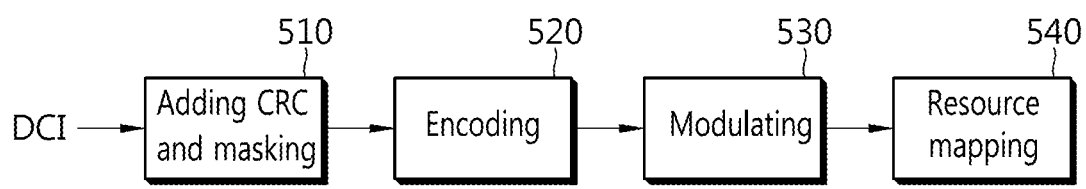
FIG. 5 is a block diagram showing a method for generating the PDCCH data.

FIG. 5 is a block diagram showing a method for generating the PDCCH data.

FIG. 5 introduces a method for generating the PDCCH data in detail.

A wireless device performs blind decoding for PDCCH detection. The blind decoding may be performed based on an identifier which is masked from a cyclic redundancy check (CRC) of a received PDCCH (referred to as a candidate PDCCH). The wireless device may determine whether the received PDCCH data are its own control data by performing CRC error checking on the received PDCCH data.

A BS determines a PDCCH format according to a downlink control information (DCI) to be transmitted to a wireless device, attaches a cyclic redundancy check (CRC) to the DCI, and masks a unique identifier (referred to as a radio network temporary identifier (RNTI)) to the CRC according to an owner or usage of the PDCCH (block 510).

If the PDCCH is for a specific wireless device, the BS may mask a unique identifier of the wireless device, e.g., cell-RNTI (C-RNTI) to the CRC. Alternatively, if the PDCCH is for a paging message, the BS may mask a paging indication identifier, e.g., paging-RNTI (P-RNTI) to the CRC. If the PDCCH is for system information, the BS may mask a system information identifier, e.g., system information-RNTI (SI-RNTI) to the CRC. In addition, in order to indicate a random access response that is a response for transmission of a random access preamble, the BS may mask a random access-RNTI (RA-RNTI) to the CRC, and in order to indicate a transmit power control (TPC) command for a plurality of wireless devices, the BS may mask a TPC-RNTI to the CRC.

The PDCCH which is masked by the C-RNTI carries control information for a specific wireless device (such information is called UE-specific control information), and the PDCCH masked by other RNTIs may carry common control information received by all or a plurality of wireless devices in a cell. A plurality of DCI formats can be defined to transmit the PDCCH data. This will be additionally described below.

The BS generates coded data by encoding the CRC-attached DCI (block 520). The encoding includes channel encoding and rate matching.

The BS generates modulation symbols by modulating the coded data (block 530).

The BS maps the coded data to physical resource elements (REs) (block 540). The BS may map the modulation symbols to each resource element (RE).

As described above, the control region in a subframe includes a plurality of control channel elements (CCEs). The CCE is a logical allocation basis used for providing the PDCCH with a coding rate depending on a radio channel state, and corresponds to a plurality of resource element groups (REGs). The REG includes a plurality of resource elements. One REG includes four Res, and one CCE includes nine REGs. In order to configure one PDCCH, 1, 2, 4 or 8 CCEs may be used, and the CCE aggregated as a basis of 1, 2, 4 or 8 is referred to as a CCE aggregation level.

The BS determines the number of CCEs used in transmission of the PDCCH according to a channel state. For example, a wireless device having a good downlink channel state may use one CCE in PDCCH transmission. On the other hand, a wireless device having a poor downlink channel state may use 8 CCEs in PDCCH transmission.

A control channel consisting of one or more CCEs performs interleaving on an REG basis, and may be mapped to a physical resource after performing cyclic shift based on a cell identifier (ID).

Figure 6:
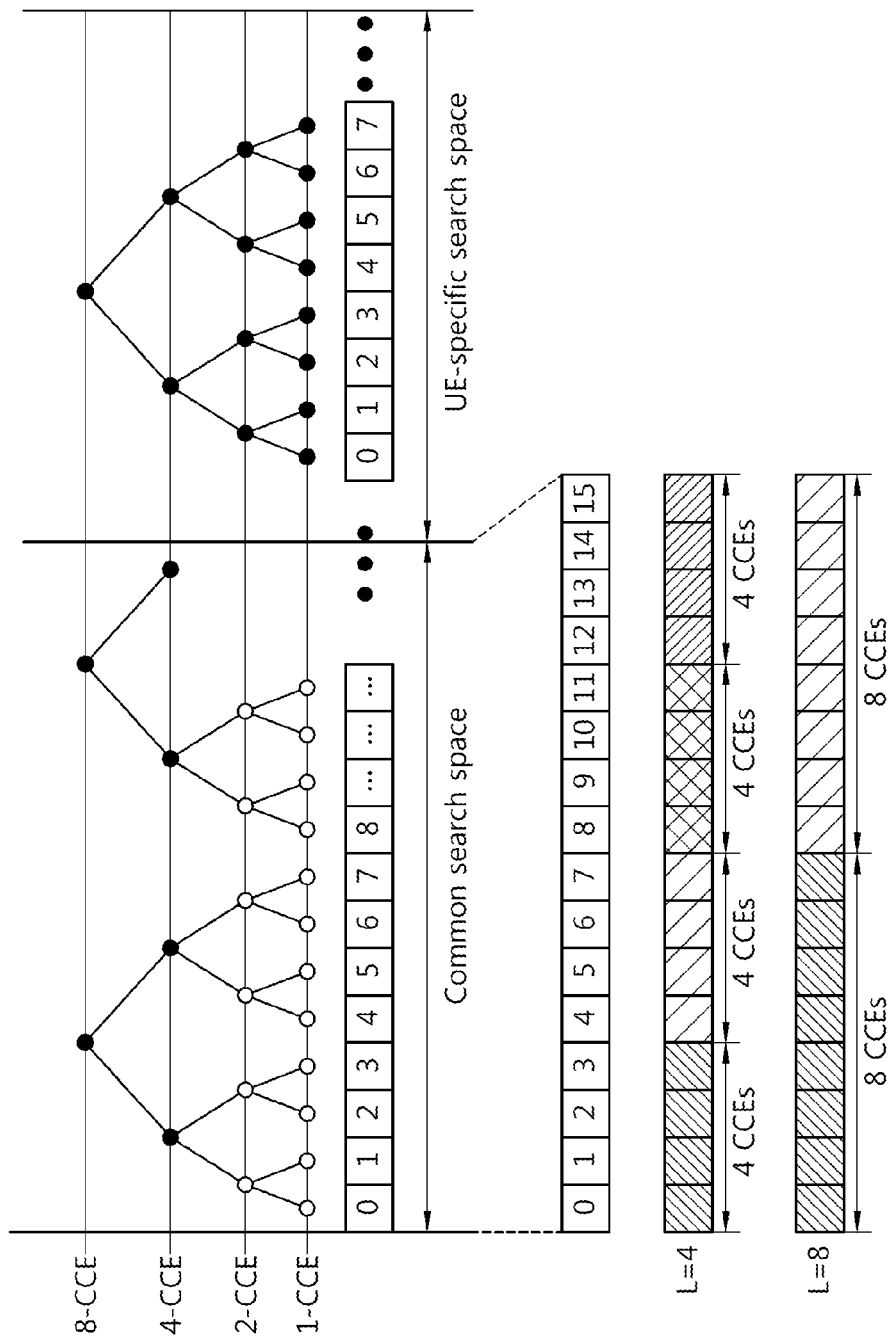
FIG. 6 shows an example of monitoring a PDCCH.

FIG. 6 shows an example of monitoring a PDCCH. The section 9 of 3GPP TS 36.213 V10.2.0 (2011-06) can be incorporated herein by reference.

A wireless device may perform blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. The wireless device cannot know about a specific position in a control region in which its PDCCH is transmitted and about a specific CCE aggregation level or DCI format used for PDCCH transmission.

A plurality of PDCCHs may be transmitted in one subframe. The wireless device monitors the plurality of PDCCHs in every subframe. Herein, the monitoring is an operation of attempting PDCCH decoding by the wireless device according to the monitored PDCCH.

The 3GPP LTE uses a search space to reduce a load of blind decoding. The search space may also be called a monitoring set of a CCE for the PDCCH. The wireless device monitors the PDCCH in the search space.

The search space is classified into a common search space and a UE-specific search space. The common search space is a space for searching for the PDCCH having common control information and consists of 16 CCEs indexed with 0 to 15, and supports the PDCCH having a CCE aggregation level of {4, 8}. However, PDCCH data (e.g., DCI formats 0, 1A) for carrying UE-specific information may also be transmitted in the common search space. The UE-specific search space supports the PDCCH having a CCE aggregation level of {1, 2, 4, 8}.

Table 1 below represents the number of PDCCH candidates monitored by the wireless device.

TABLE 1

| Type | Search space $S_k^{(L)}$ | | Number of PDCCH candidates $M^{(L)}$ | DCI format |
|---|---|---|---|---|
| | Aggregation level L | Size [in CCEs] | | |
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a wireless device identifier (e.g., C-RNTI), a CCE aggregation level, and/or a slot number in a radio frame. If the start point of the UE-specific search space exists in the common search space, the UE-specific search space and the common search space may overlap with each other.

The set of PDCCH candidates may be defined based on a search space. In an aggregation level 1, 2, 3, or 8, a search space $S_k^{(L)}$ is defined as a set of PDCCH candidates. A CCE corresponding to a PDCCH candidate m of the search space $S_k^{(L)}$ is given by Equation 1 below.

$$L \cdot \{(Y_k + m') \bmod \lfloor N_{CCE,k}/L \rfloor\} + i \qquad \text{<Equation 1>}$$

Herein, i=0, . . . , L−1. If a search space is the common search space, m'=m. If a search space is the UE-specific search space and a carrier indicator field (CIF) is set to a wireless device, m'=m+$M^{(L)} \cdot n_{CI}$, herein, $n_{CI}$ is a value of the CIF. If the CIF is not set to the wireless device, m'=m. Herein, m=0, . . . , $M^{(L)}$−1, and $M^{(L)}$ is the number of PDCCH candidates for monitoring a given search space.

In a common search space, $Y_k$ is set to 0 with respect to two aggregation levels L=4 and L=8. In a UE-specific search space of the aggregation level L, a variable $Y_k$ is defined by Equation 2 below.

$$Y_k = (A \cdot Y_{k-1}) \bmod D \qquad \text{<Equation 2>}$$

Herein, $Y_{-1} = n_{RNTI} \neq 0$, A=39827, D=65537, k=$\lfloor n_s/2 \rfloor$, and $n_s$ denotes a slot number in a radio frame.

When a wireless device monitors the PDCCH by using the C-RNTI, a search space and a DCI format used in monitoring are determined according to a transmission mode of the PDSCH. Table 2 below represents an example of PDCCH monitoring in which the C-RNTI is set.

TABLE 2

| Transmission mode | DCI format | Search space | PDSCH transmission mode according to PDCCH |
|---|---|---|---|
| Mode 1 | DCI format 1A | Common and UE-specific | Single antenna port, port 0 |
| | DCI format 1 | UE-specific | Single antenna port, port 0 |
| Mode 2 | DCI format 1A | Common and UE-specific | Transmission diversity |
| | DCI format 1 | UE-specific | Transmission diversity |
| Mode 3 | DCI format 1A | Common and UE-specific | Transmission diversity |
| | DCI format 2A | UE-specific | Cyclic Delay Diversity (CDD) or transmission diversity |
| Mode 4 | DCI format 1A | Common and UE-specific | Transmission diversity |
| | DCI format 2 | UE-specific | Closed-loop spatial multiplexing |
| Mode 5 | DCI format 1A | Common and UE-specific | Transmission diversity |
| | DCI format 1D | UE-specific | Multi-user Multiple Input Multiple Output (MU-MIMO) |
| Mode 6 | DCI format 1A | Common and UE-specific | Transmission diversity |
| | DCI format 1B | UE-specific | Closed-loop spatial multiplexing |
| Mode 7 | DCI format 1A | Common and UE-specific | If the number of PBCH transmission port is 1, single antenna port, port 0, otherwise, transmission diversity |
| | DCI format 1 | UE-specific | Single antenna port, port 5 |
| Mode 8 | DCI format 1A | Common and UE-specific | If the number of PBCH transmission port is 1, single antenna port, port 0, otherwise, transmission diversity |
| | DCI format 2B | UE-specific | Dual layer transmission (port 7 or 8), or single antenna port, port 7 or 8 |

The usage of the DCI format is classified as shown in Table 3 below.

TABLE 3

| DCI format | Contents |
|---|---|
| DCI format 0 | Used for PUSCH scheduling |
| DCI format 1 | Used for one PDSCH codeword scheduling |
| DCI format 1A | Used for one PDSCH codeword compact scheduling and random access procedure |
| DCI format 1B | Used for one PDSCH codeword compact scheduling that has precoding information |
| DCI format 1C | Used for very compact scheduling of one DSCH codeword |
| DCI format 1D | Used for one PDSCH codeword compact scheduling that has precoding and power offset information |
| DCI format 2 | Used for PDSCH scheduling of the UEs that are configured in closed-loop spatial multiplexing mode |
| DCI format 2A | Used for PDSCH scheduling of the UEs that are configured in open-loop spatial multiplexing mode |
| DCI format 3 | Used for TPC command transmission of PUCCH that has 2 bit power adjustments and PUSCH |
| DCI format 3A | Used for TPC command transmission of PUCCH that has 1 bit power adjustments and PUSCH |

The DCI format and the search space may be differently determined depending on the RNTI masked to a CRC which is used in generating the DCI. Table 4 below represents the search space and the DCI format used in case that SI-RNTI, P-RNTI, or RA-RNTI is masked to a CRC of the DCI.

TABLE 4

| DCI format | Search space | PDSCH transmission mode according to PDCCH |
|---|---|---|
| DCI format 1C | Common | If the number of PBCH transmission port is 1, single antenna port, port 0, otherwise, transmission diversity |
| DCI format 1A | Common | If the number of PBCH transmission port is 1, single antenna port, port 0, otherwise, transmission diversity |

Table 5 below represents the search space and the DCI format used in case that SPS-C-RNT is masked to a CRC of the DCI.

TABLE 5

| Transmission mode | DCI format | Search space | PDSCH transmission mode according to PDCCH |
|---|---|---|---|
| Mode 1 | DCI format 1A | Common and UE-specific | Single antenna port, port 0 |
| | DCI format 1 | UE-specific | Single antenna port, port 0 |
| Mode 2 | DCI format 1A | Common and UE-specific | Transmission diversity |
| | DCI format 1 | UE-specific | Transmission diversity |
| Mode 3 | DCI format 1A | Common and UE-specific | Transmission diversity |
| | DCI format 2A | UE-specific | Transmission diversity |
| Mode 4 | DCI format 1A | Common and UE-specific | Transmission diversity |
| | DCI format 2 | UE-specific | Transmission diversity |
| Mode 5 | DCI format 1A | Common and UE-specific | Transmission diversity |
| Mode 6 | DCI format 1A | Common and UE-specific | Transmission diversity |
| Mode 7 | DCI format 1A | Common and UE-specific | Single antenna port, port 5 |
| | DCI format 1 | UE-specific | Single antenna port, port 5 |
| Mode 8 | DCI format 1A | Common and UE-specific | Single antenna port, port 7 |
| | DCI format 2B | UE-specific | Single antenna port, port 7 or 8 |
| Mode 9 | DCI format 1A | Common and UE-specific | Single antenna port, port 7 |
| | DCI format 2C | UE-specific | Single antenna port, port 7 or 8 |
| Mode 10 | DCI format 1A | Common and UE-specific | Single antenna port, port 7 |
| | DCI format 2D | UE-specific | Single antenna port, port 7 or 8 |

Table 6 below represents the search space and the DCI format used in case that temporary C-RNTI is masked to a CRC of the DCI.

TABLE 6

| DCI format | Search space | PDSCH transmission mode according to PDCCH |
|---|---|---|
| DCI format 1A | Common and UE-specific | If the number of PBCH transmission port is 1, single antenna port, port 0, otherwise, transmission diversity |
| DCI format 1 | UE-specific | If the number of PBCH transmission port is 1, single antenna port, port 0, otherwise, transmission diversity |

Figure 7:
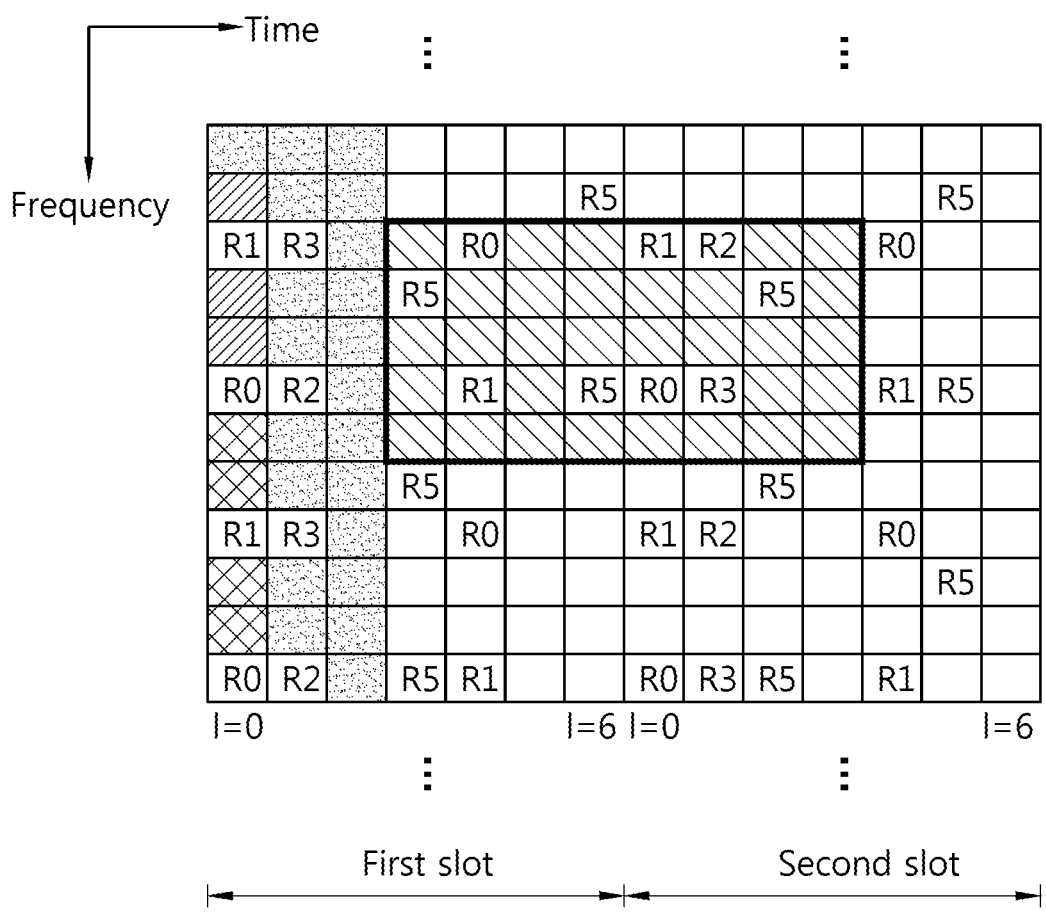
FIG. 7 shows an example of a downlink subframe in which a reference signal and a control channel in 3GPP LTE are allocated.

FIG. 7 shows an example of a downlink subframe in which a reference signal and a control channel in 3GPP LTE are allocated.

A downlink subframe may be classified into a control region and a data region. For example, in the downlink subframe, the control region (or a PDCCH region) includes front three OFDM symbols and the data region in which a PDSCH is transmitted includes remaining OFDM symbols.

In the control region, a PCFICH, a PHICH and/or the PDCCH are transmitted.

The physical HARQ ACK/NACK indicator channel (PHICH) may transmit a hybrid automatic retransmission request (HARQ) information as a response to a uplink transmission.

The physical control format indicator channel (PCFICH) may transmit the information of the number of OFDM symbols allocated to the PDCCH. For example, a control format indicator (CFI) of the PCFICH may indicate three OFDM symbols. The region excluding the resource through which the PCFICH and/or the PHICH is transmitted is the PDCCH region that a wireless device monitors the PDCCH.

In the subframe, various reference signals may be transmitted as well.

A cell-specific reference signal reference signal (CRS) is a reference signal that all wireless devices in a cell may receive, and may be transmitted over the whole downlink frequency band. In FIG. 6, 'R0' denotes an RE (resource element) where a CRS for a first antenna port is transmitted, 'R1' which is an RE where a CRS for a second antenna port is transmitted, 'R2' which is an RE where a CRS for a third antenna port is transmitted, and 'R3' which is an RE where a CRS for a fourth antenna port is transmitted.

The RS sequence $r_{l,n_s}(m)$ for CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{<Equation 3>}$$

Herein, $$m = 0, 1, \ldots, 2N_{RB}^{max,DL} - 1, N_{RB}^{max,DL}$$

is the maximum number of RBs, ns is a slot number in a radio frame, and l is an OFDM symbol index in a slot.

A pseudo-random sequence, c(i), is defined by a gold sequence whose length is 31, as follows.

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{<Equation 4>}$$

Herein, Nc=1600, and the first m-sequence is initialized as x1(0)=1, x1(n)=0, m=1, 2, ..., 30. The second m-sequence is initialized as $c_{init}=2^{10} \cdot (7 \cdot (n_s-1)+l+1) \cdot (2 \cdot N_{ID}^{cell}+1)+2 \cdot N_{ID}^{cell}+N_{CP}$ at the beginning of each OFDM symbol. $N_{ID}^{cell}$ is a physical cell identity (PCI) of the cell, and $N_{CP}=1$ in case of the normal CP, and $N_{CP}=0$ in case of the extended CP.

Also, a UE-specific reference signal (URS) may be transmitted in a subframe. Although the CRS is transmitted in the entire region of a subframe, the URS is transmitted in the data region of the sub-frame, and is a reference signal used for demodulating the PDSCH. In FIG. 7, 'R5' denotes an RE where the URS is transmitted. A DM-RS is a reference signal used for demodulating the EPDCCH data.

The URS may be transmitted in an RB in which the corresponding PDSCH data is mapped. Although in FIG. 7, R5 is denoted outside the area in which the PDSCH is transmitted, this is merely to indicate the position of the RE to which the URS is mapped.

The URS is may be a reference signal which is demodulated only by a specific wireless device. The RS sequence $r_{l,n_s}(m)$ for the URS is the same as Equation 3. At this time, $m=0, 1, \ldots, 12N_{RB}^{PUSCH}-1$, and $N_{RB}^{PDSCH}$ is the number of RBs which is used for the corresponding PDSCH transmission. In case that the URS is transmitted through a single antenna, the pseudo-random sequence generator is initialized as $c_{init}=(\lfloor n_s/2 \rfloor+1) \cdot (2N_{ID}^{cell}+1) \cdot 2^{16}+n_{RNTI}$ at the start of each subframe. $n_{RNTI}$ is an identifier of a wireless device.

The above-described initializing method is associated with the case where the URS is transmitted through a single antenna. When the URS is transmitted through a multi-antenna, the pseudo-random sequence generator is initialized as $c_{init}=(\lfloor n_s/2 \rfloor+1) \cdot (2n_{ID}^{(nSCID)}+1) \cdot 2^{16}+n_{SCID}$ at the start of each sub-frame. $n_{SCID}$ is a parameter that is acquired from a DL grant (for example, DCI format 2B or 2C) related with PDSCH transmission.

The URS supports multiple input multiple output (MIMO) transmission. Depending on an antenna port or layer, the RS sequence for the URS may be spread to the spread sequence as follows.

TABLE 7

| Layer | [w(0) ... w(1) ... w(2) ... w(3)] |
|---|---|
| 1 | [+1 ... +1 ... +1 ... +1] |
| 2 | [+1 ... −1 ... +1 ... −1] |
| 3 | [+1 ... +1 ... +1 ... +1] |
| 4 | [+1 ... −1 ... +1 ... −1] |
| 5 | [+1 ... +1 ... −1 ... −1] |
| 6 | [−1 ... −1 ... +1 ... +1] |
| 7 | [+1 ... −1 ... −1 ... +1] |
| 8 | [−1 ... +1 ... +1 ... −1] |

A layer may be defined as an information path inputted to a pre coder. A rank is the number of non-zero eigenvalue in the MIMO channel matrix, and is the same as the number of layer or space stream. The layer may correspond to an antenna port that distinguishes the URS and/or a spread sequence which is applied to the URS.

Meanwhile, the PDCCH is monitored in a restricted region such as a control region in a subframe, and the CRS transmitted from whole bands is used for demodulating the PDCCH. As the sort of control data becomes diverse and an amount of the control data is increased, a flexibility of scheduling becomes deteriorated with the existing PDCCH only. Also, in order to decrease overhead owing to the CRS transmission, an enhanced PDCCH (EPDCCH) is introduced.

Figure 8:
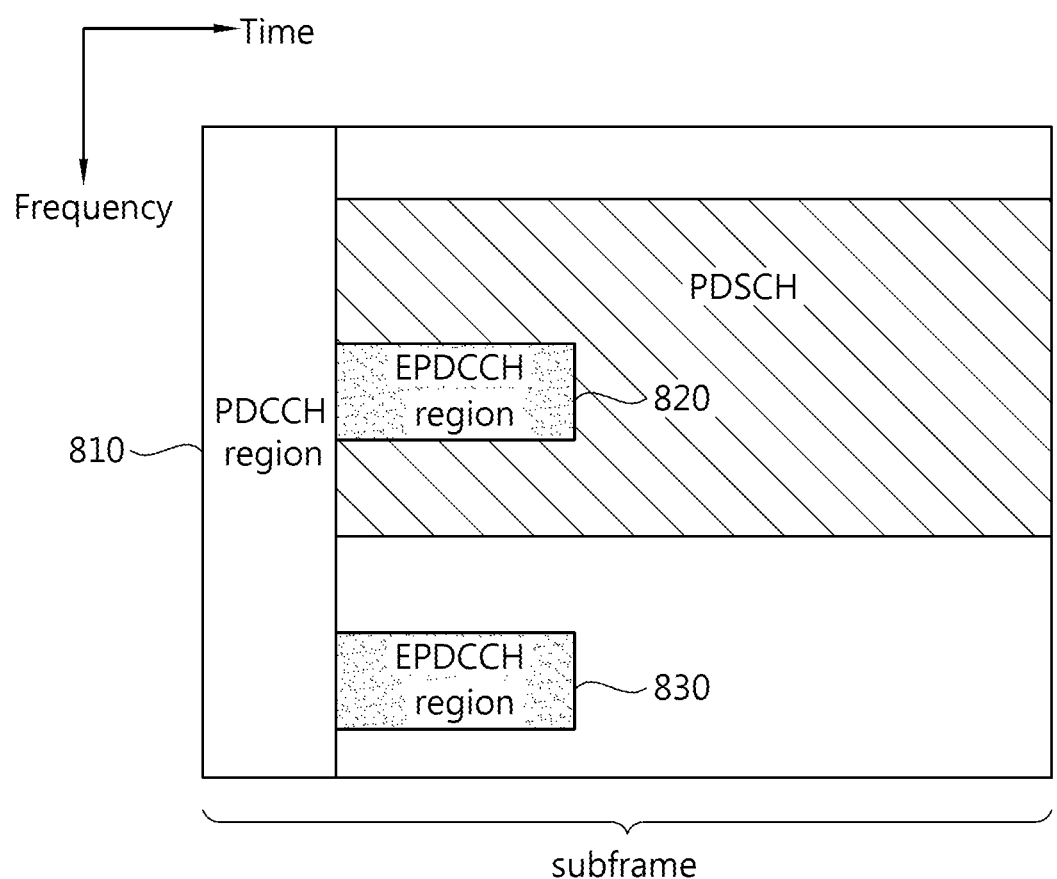
FIG. 8 shows an example of subframe having an EPDCCH.

FIG. 8 shows an example of subframe having an EPDCCH.

The subframe may include zero or one PDCCH region 810 and zero or more EPDCCH regions 820 and 830.

The EPDCCH regions 820 and 830 are regions in which a wireless device monitors the EPDCCH. The PDCCH region 810 is located in up to first four OFDM symbols of the subframe, whereas the EPDCCH regions 820 and 830 may be flexibly scheduled in an OFDM symbol located after the PDCCH region 810.

One or more EPDCCH regions 820 and 830 may be assigned to the wireless device. The wireless device may monitor EPDDCH data in the assigned EPDCCH regions 820 and 830.

The number/location/size of the EPDCCH regions 820 and 830 and/or information regarding a subframe for monitoring the EPDCCH may be reported by a BS to the wireless device by using a radio resource control (RRC) message or the like.

In the PDCCH region 810, a PDCCH may be demodulated on the basis of a CRS. In the EPDCCH regions 820 and 830, instead of the CRS, a DM-RS may be defined for demodulation of the EPDCCH. An associated DM-RS may be transmitted in the EPDCCH regions 820 and 830.

An RS sequence for the associated DM-RS is equivalent to Equation 3. In this case, m=0, 1, . . . , $12N_{RB}^{max,DL}-1$ and $N_{RB}^{max,DL}$ is a maximum number of RBs. A pseudo-random sequence generator may be initialized as $c_{init}=(\lfloor n_s/2 \rfloor+1) \cdot (2n_{ID,i}^{EPDCCH}+1) \cdot 2^{16}+n_{SCID}^{EPDCCH}$ at a start of each subframe. ns is a slot number of a radio frame, $n_{ID,i}^{EPDCCH}$ is a cell index related to a corresponding EPDCCH region, and $n_{SCID}^{EPDCCH}$ is a parameter given from higher layer signaling.

Each of the EPDCCH regions 820 and 830 may be used to schedule a different cell. For example, an EPDCCH in the EPDCCH region 820 may carry scheduling information for a primary cell, and an EPDCCH in the EPDCCH region 830 may carry scheduling information for a secondary cell.

When the EPDCCH is transmitted through multiple antennas in the EPDCCH regions 820 and 830, the same precoding as used in the EPDCCH may be applied to a DM-RS in the EPDCCH regions 820 and 830.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}. A search space may also be defined in the EPDCCH region. A wireless device may monitors EPDCCH candidates based on an aggregation level.

Figure 9:
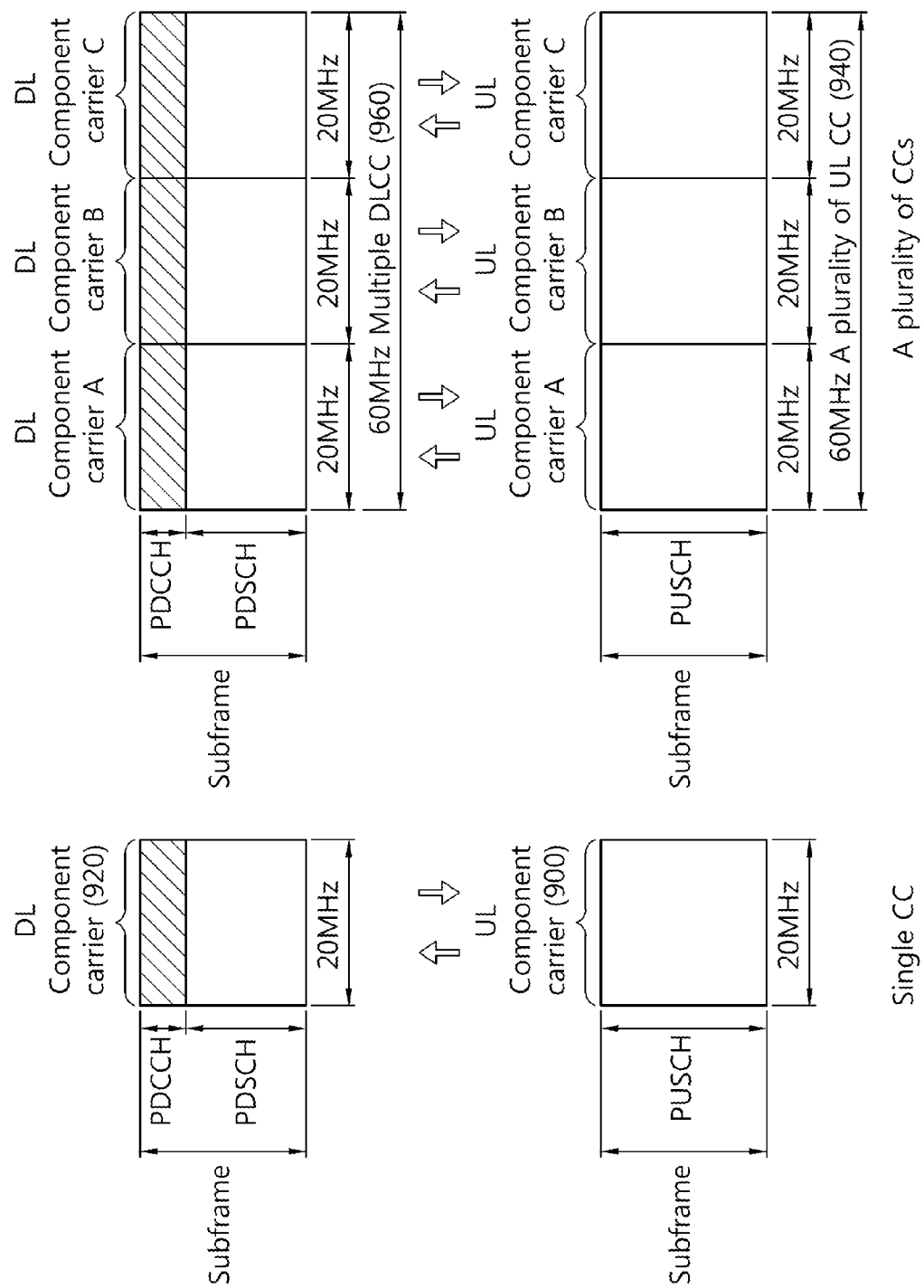
FIG. 9 is a conceptual diagram showing a carrier aggregation.

FIG. 9 is a conceptual diagram showing a carrier aggregation.

FIG. 9(A) shows a single component carrier (CC). A single CC may correspond to an uplink frequency band 900 and a downlink frequency band 920 of 20 MHz. FIG. 9(B) shows multiple CCs. For example, the multiple CC may correspond to an uplink frequency band 940 and a downlink frequency band 960 of 60 MHz in which the uplink frequency band and the downlink frequency band of 20 MHz are aggregated.

A BS may transmit data to a wireless device through the plurality of downlink CCs by performing a carrier aggregation. The BS may perform a downlink transmission using N downlink CCs. In this time, if a wireless device may receive downlink data through only M (M is a natural number smaller than or equal to N) downlink CCs, the wireless device may receive the downlink data which are transmitted through only the M downlink CCs from the BS.

Additionally, a BS may set a frequency bandwidth that corresponds to L (L is a natural number smaller than or equal to M and N) downlink CCs as a main CC and operate the frequency bandwidth. The wireless device may preferentially monitor and receive the data that the BS transmits through a main CC. In case of performing the carrier aggregation, a CC may be distinguished according to a cell.

In case of performing the carrier aggregation using the CC of a primary cell (P-cell) and the CC of a secondary cell (S-cell), a carrier that corresponds to the CC of a P-cell among the carriers used in downlink and uplink is called a primary cell component carrier (PCC) and a carrier that corresponds to the CC of S-cell is called a second cell component carrier (SCC).

Figure 10:
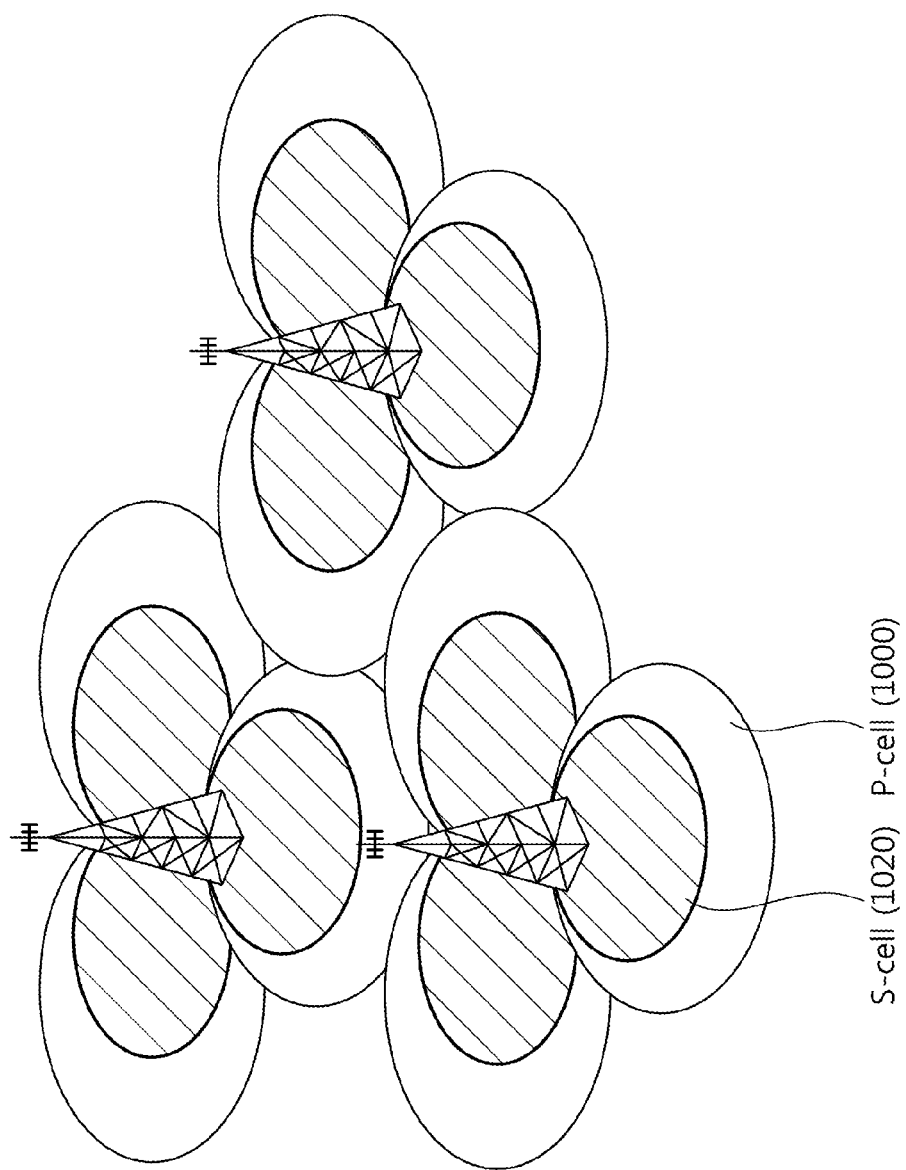
FIG. 10 is a conceptual diagram showing the P-cell and the S-cell.

FIG. 10 is a conceptual diagram showing the P-cell and the S-cell.

Referring to FIG. 10, a BS may perform a carrier aggregation based on the PCC of a P-cell 1000 and the SCC of one or more S-cell 1020. In case that two or more cells exist, the BS may determine one cell to be the P-cell 1000 and other cells to be S-cell 1020. The BS may aggregate the CCs of the determined P-cell 1000 and the S-cell 1020, and transmit data to a wireless device using an aggregated frequency bandwidth. The wireless device may also transmit data to the BS using the aggregated frequency bandwidth. As an exemplary case among the scenarios in which the P-cell 1000 and the S-cell 2010 are deployed, the P-cell and the S-cell 1020 shown in FIG. 10 shows the case that a transmission range of the data transmitted based on the PCC of the P-cell 1000 is greater than a transmission range of the data transmitted based on the SCC of the S-cell 1020.

The wireless device may perform the radio resource control (RRC) connection through the PCC of the P-cell 1000. Furthermore, the wireless device may attempt to perform a random access to the BS through a physical random access channel (PRACH) based on a signal signaled through the PCC. That is, the wireless device may perform an initial connection establishment process or a connection re-establishment process to the BS through the PCC in the carrier aggregation environment.

The SCC of the S-cell 1020 may be used for providing additional radio resources. In order to perform the carrier aggregation that adds the SCC to the PCC, the wireless device should perform a neighbor cell measurement that the wireless device acquires the information of neighboring cells. Based on the neighbor cell measurement performed by the wireless device, the BS may determine whether to aggregate the SCC into the PCC. For example, in the P-cell, a legacy subframe may be transmitted through the PCC, and in the S-cell, a NCT subframe which will be described below may be transmitted through the SCC. The legacy subframe may be a subframe used for being distinguished from the subframe defined prior to 3GPP LTE-A release 11 or the NTC subframe newly defined in 3GPP LTE-A release 12.

In case that the legacy subframe is transmitted through the PCC in the P-cell 1000, and the NCT subframe which will be described below is transmitted through the SCC in the S-cell 1020, the resource allocation information for the resources transmitted in the NCT subframe may be transmitted based on a control channel included in the legacy subframe. That is, a cross carrier scheduling in order for the PDCCH of one CC to transmit data information of other CCs may be used. In case that the cross carrier scheduling is applied, the DCI related to the PDSCH which is transmitted in the S-cell may be transmitted through the PDCCH of the P-cell to prevent an interference on the PDCCH. Accordingly, the cross carrier scheduling can limit the PDCCH capacity for a macro cell.

The BS may transmit the PDCCH data to the wireless device through the PCC. The PDCCH data may include allocation information for the PDSCH data which are transmitted through the downlink PCC band and the SCC band and information for approving data transmission through the uplink.

The P-cell 1000 and the S-cell 1020 may perform the carrier aggregation through a configuration and an activation operation, and transmit or receive data through an aggregated frequency band.

The activation/deactivation operation of the S-cell may be performed as follows.

One or more S-cell may be configured to a wireless device, and an activated cell among the configured S-cells may serve the wireless device. Although the P-cell is always activated, the S-cell setup for the wireless device may be configured as an activated state or a deactivated state. Based on the received activation/deactivation MAC control element, the wireless device may determine whether to activate or deactivate the S-cell. Also, the wireless device may determine whether to activate the S-cell using a sCellDeactivationTimer for the set S-cell. The wireless device may deactivate the S-cell which is setup depending on whether the sCellDeactivationTimer which is setup terminates. In the sCellDeactivationTimer, for example, the same initial value may be setup, and an initial time value of the sCellDeactivationTimer may be setup by the RRC. The S-cell setup to the wireless device may be operated in deactivation state in a specific case (for example, after a handover and at an initial time of performing S-cell addition).

The operations of wireless device according to the activation and deactivation of the S-cell which is setup may be as follows. If the wireless device receives the activation/deactivation MAC control elements including the information that instructs to activate a specific S-cell, the wireless device may activate the specific S-cell during a transmission time interval (TTI). In case that the S-cell is activated, for example, the wireless device may 1) transmit the SRS to the S-cell, 2) perform the CQI/PMI/RI/PTI reporting which is measured for the S-cell, 3) monitor the PDCCH which is transmitted from the S-cell, or 4) monitor the PDCCH for the S-cell. Also, the wireless device may start or restart the sCellDeactivationTimer for the S-cell which is activated.

If the wireless device receives the activation/deactivation MAC control elements including the information that instructs to deactivate the specific S-cell during the TTI or the sCellDeactivationTimer which is setup to the S-cell is terminated, the wireless device may 1) deactivate the S-cell during the TTI, 2) stop the operation of the sCellDeactivationTimer which is related to the S-cell, or 3) flush all HARQ buffers which are related to the S-cell.

If the wireless device performs the uplink grant or the downlink assignment in the PDCCH transmitted from the S-cell which is activated, or performs the uplink grant or the downlink assignment for the S-cell which is activated in the PDCCH of the serving cell that schedules the S-cell which is activated, the wireless device may restart the sCellDeactivationTimer for the S-cell.

If the S-cell is deactivated, the wireless device may 1) not transmit the SRS and/or CQI/PMI/RI/PTI, 2) not transmit an uplink shared channel (UL-SCH) to the S-cell, 3) not monitor the PDCCH which is transmitted from the S-cell, or 4) not monitor the PDCCH which is transmitted for the S-cell.

Figure 11:
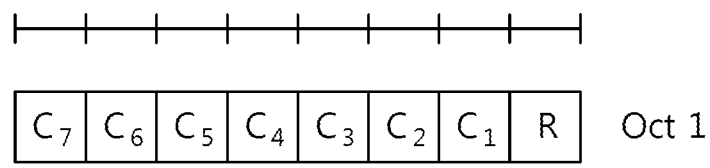
FIG. 11 is a conceptual diagram showing the activation/deactivation MAC control elements.

FIG. 11 is a conceptual diagram showing the activation/deactivation MAC control elements.

Referring to FIG. 11, the activation/deactivation MAC control elements may be distinguished by a subheader of a MAC protocol data unit (PDU) that includes a logical channel identifier (LCID). The activation/deactivation MAC control elements may have fixed size, and comprised of a single octet that has seven C-field and one R-field. The activation/deactivation MAC control elements may be defined as follows.

Ci: In case that there exists an S-cell which is setup by an S-cell index, the Ci field may instruct the activation/deactivation state of the S-cell that corresponds to the S-cell index i. If there does not exist the S-cell which is setup by the S-cell index, the Ci field may be ignored. If the Ci field is setup to 1, the S-cell that corresponds to the Ci field may be activated. Also, the Ci field is setup to 0, the S-cell that corresponds to the Ci field may be deactivated.

R: As a reserved bit, zero may be setup.

Figure 12:
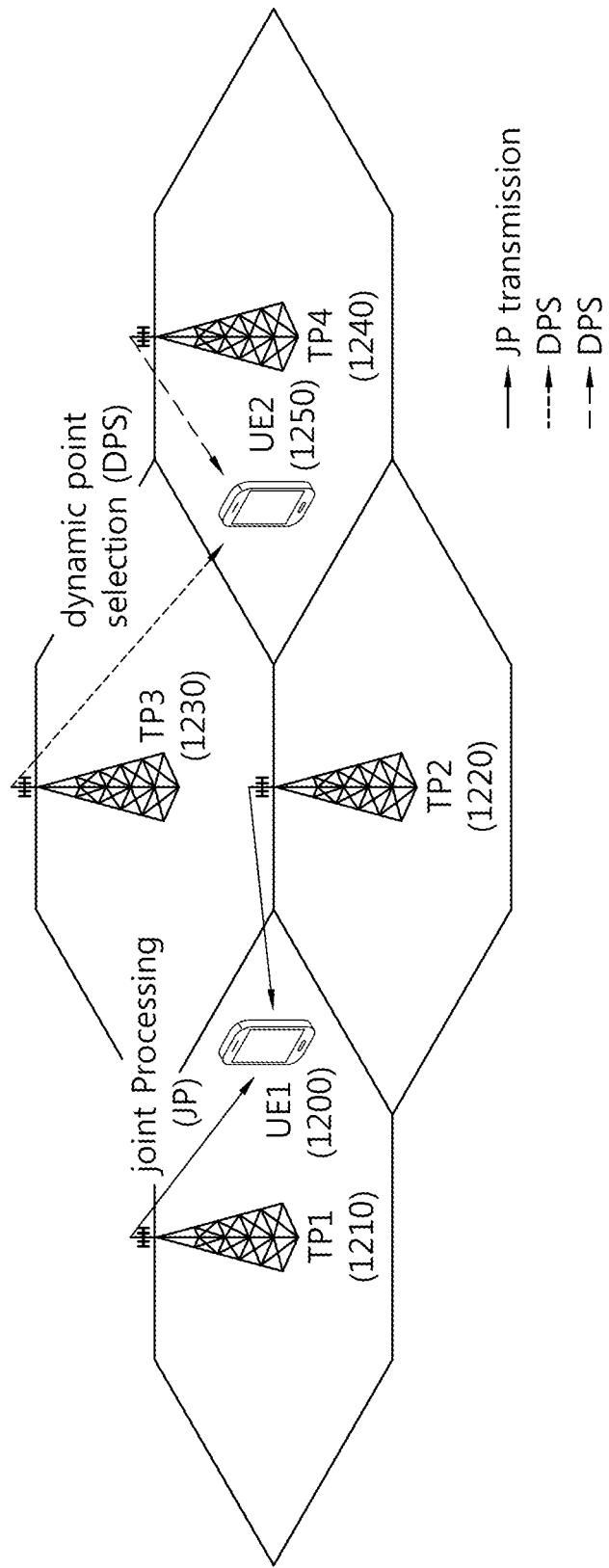
FIG. 12 is a conceptual diagram showing a method of transmitting data to a wireless device based on a coordinated multi points (CoMP) in a plurality of transmission points.

FIG. 12 is a conceptual diagram showing a method of transmitting data to a wireless device based on a coordinated multi points (CoMP) in a plurality of transmission points.

Referring FIG. 12, traffic data and control data may be transmitted to a wireless device based on a CoMP at a plurality of transmission points. The plurality of transmission points may generate data which are transmitted to a wireless device within a cell based on a cell ID which is identical or different. The plurality of transmission points may be called a plurality of serving cells or cells in other terminology, and the CoMP may transmit or receive data based on serving cells which are different from each other.

A method is shown that a first transmission point 1210 and a second transmission point 1220 transmit data to a wireless device using a joint transmission (JT) method of the CoMP. In case that the plurality of transmission points 1210 and 1220 transmit data to the wireless device 1200 using the JT method, the same data may be transmitted to the wireless device 1200 from different transmission points 1210 and 1220. The wireless device 1200 may receive and demodulate the data transmitted from different transmission points 1210 and 1220.

A third transmission point 1230 and a fourth transmission point 1240 may transmit data to a wireless device 1250 using a dynamic point selection (DPS) method of the CoMP.

In the DPS method, the wireless device may receive data by dynamically selecting a transmission point having a better channel from the transmission points 1230 and 1240 different from each other. For example, when transmitting EPDCCH data to the wireless device 1250 from the third transmission point 1230 on a first time, EPDCCH data may be transmitted to the wireless device 1250 from the fourth transmission point 1240 on a second time.

Figure 13:
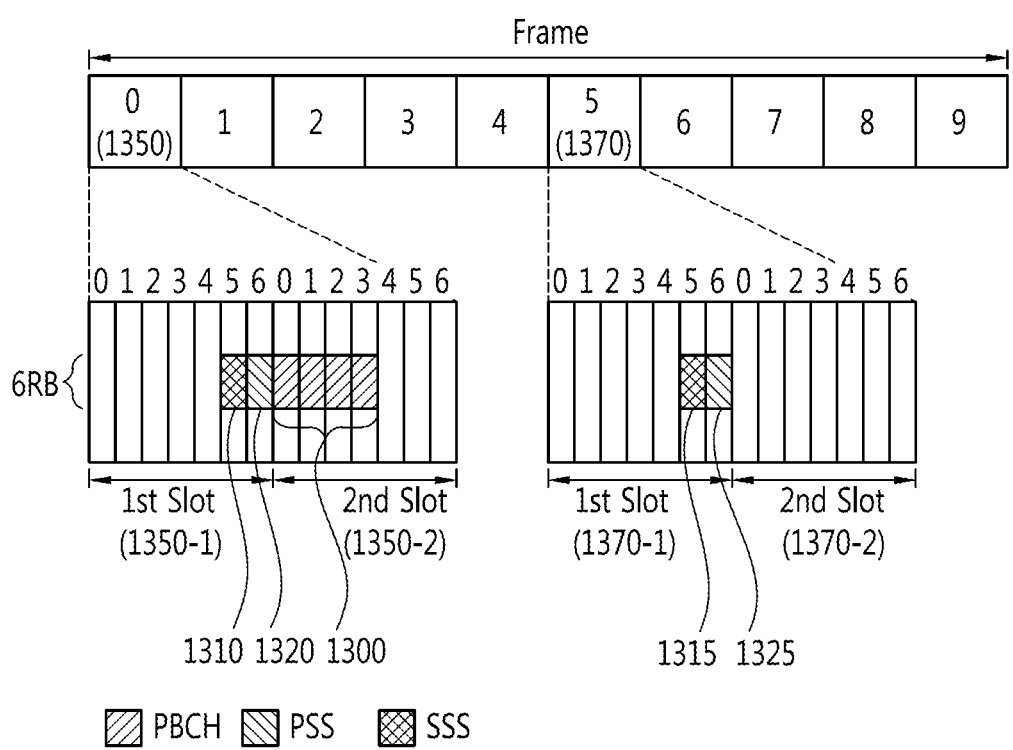
FIG. 13 shows a transmission of a synchronization signal and PBCH data in a legacy subframe when Frequency Division Duplexing (FDD) is used in according to a duplexing method.

FIG. 13 shows a transmission of a synchronization signal and PBCH data in a legacy subframe when Frequency Division Duplexing (FDD) is used in according to a duplexing method.

A physical broadcast channel (PBCH) 1300 is transmitted in former four OFDM symbols in a second slot 1350-2 in the first subframe (i.e., subframe 1350 having an index is 0) of a radio frame. The PBCH 1300 carries system information essential for a wireless device to communicate with a BS, and system information transmitted through the PBCH 1300 is called a master information block (MIB). In contrast, system information transmitted on a PDSCH that is indicated by a PDCCH is called a system information block (SIB).

Seventh OFDM symbols (i.e., OFDM symbol having an index 6), from among OFDM symbols allocated to the first slots 1350-1 and 1370-1 of the first subframe (i.e., subframe 1350 having an index 0) and a sixth subframe (i.e., subframe 1370 having an index 5), may include respective primary synchronization signals (PSSs) 1320 and 1325. The PSSs 1320 and 1325 may be used for acquiring OFDM symbol synchronization or slot synchronization. Furthermore, the information of a physical cell ID may be acquired through the PSSs 1320 and 1325. A primary synchronization code (PSC) is a sequence which is used for generating the PSSs 1320 and 1325. The PSS may be generated by defining a plurality of PSCs in 3GPP LTE. A BS may generate the PSSs 1320 and 1325 using one of 3 PSCs based on a cell ID. A wireless device may acquire the information of the cell ID based on the PSC by receiving the PSSs 1320 and 1325.

sixth OFDM symbols (i.e., OFDM symbol having an index 5), from among OFDM symbols allocated to the first slots 1350-1 and 1370-1 of the first subframe (i.e., subframe 1350 having an index 0) and a sixth subframe (i.e., subframe 1370 having an index 5), may include secondary synchronization signals (SSSs) 1310 and 1315.

The first SSS 1310 may be transmitted through sixth OFDM symbol in the first slot 1350-1 of the first subframe 1350 and the second SSS 1325 may be transmitted through sixth OFDM symbol in the first slot 1370-1 of the sixth subframe 1370. The SSSs 1310 and 1315 may be used for obtain frame synchronization. The SSSs 1310 and 1315 are used for acquiring information of a cell ID together with the PSSs 1320 and 1325.

The first SSS 1310 and the second SSS 1315 may be generated using different secondary synchronization codes (SSCs). When each of the first SSS 1310 and the second SSS 1315 includes 31 subcarriers, each of the two SSC sequences whose length is 31 is used for the first SSS 1310 and the second SSS 1315.

From a viewpoint of a frequency domain, the PBCH 1300, the PSSs 1320 and 1325, and the SSSs 1310 and 1315 are transmitted within a frequency bandwidth that corresponds to 6 RBs on the basis of a center frequency of the subframe.

In a new LTE-A release, a new format of subframe may be defined and used. The newly defined subframe may be defined with a terminology of a new carrier (NCT) subframe. The NCT subframe may be defined and used as follows in detail.

In the existing LTE release 8/9/10 systems, a control channel, a reference signal, and a synchronization signal, such as a CRS, a PSS/SSS, a PDCCH, and PBCHs, can be transmitted through a downlink carrier. A subframe in which the control channel, the reference signal, and the synchronization signal are defined can be called a legacy subframe. In systems posterior to the LTE release 8/9/10 systems, some of channels or signals transmitted in an existing legacy subframe may not be transmitted in order to improve an interference problem between a plurality of cells and improve carrier extensibility. This subframe can be defined as a term called an extension carrier subframe or an NCT subframe. For example, the NCT subframe may not include PDCCH data, a control channel, such as a CRS, and/or information about a reference signal. For example, if a PDCCH is not present in the NCT subframe, control information can be transmitted through an EPDCCH. The PDSCH of the NCT subframe can be allocated based on the EPDCCH included in the NCT subframe.

It may be assumed that both a legacy subframe and an NCT subframe are transmitted by a plurality of transmission point (TP) based on the CoMP. In this case, the information of the PDSCH allocation transmitted through the NCT subframe may also be included in the PDCCH included in the legacy subframe. In the NCT subframe, downlink control information such as the DCI may be transmitted through the EPDDCH. Since the CRS is not transmitted in the NCT subframe, the DCI may be demodulated based on a reference signal such as a DM-RS. The NCT subframe can be called an NCT subframe even when the NCT subframe and a legacy subframe have been configured in one subframe in accordance with a time division multiplexing (TDM) scheme. For example, even when one slot is generated by configuring the channel and signal of an NCT subframe and the other slot is generated by configuring the channel and signal of a legacy subframe, the corresponding subframe may be called an NCT subframe. Furthermore, the NCT subframe and the legacy subframe may be split based on the time within one frame in accordance with a TDM method and then transmitted. For example, a frame transmitted in one cell may include both an NCT subframe and a legacy subframe, and this frame may also be called an NCT frame.

Assuming a P-cell that transmits data based on a legacy subframe and an S-cell that transmits data using an NCT subframe, data may be transmitted to a wireless device based on the P-cell and the S-cell. That is, the NCT subframe may be a subframe that is transmitted in an SCC, that is, a frequency band allocated to the S-cell. When transmitting data to the wireless device based on the P-cell and the S-cell, a BS may inform the S-cell of the position of an OFDM symbol at which a PDSCH is started in the legacy subframe through higher layer signaling. A parameter informing the position of the OFDM symbol at which the PDSCH is started in the legacy subframe is an $I_{datatstart}$ parameter. The $I_{datatstart}$ parameter may have a value of 1 to 4.

An NCT frame including the NCT subframe may include 10 NCT subframes. The NCT frame may transmit a reference signal that performs time/frequency tracking only in a specific subframe not all the NCT subframes included in the NCT frame. The reference signal included and transmitted in the NCT subframe and performing time/frequency tracking may be called a tracking reference signal (TRS). Instead of the terminology TRS, the reference signal, included and transmitted in the NCT subframe and performing time/frequency tracking, may be represented by a terminology enhanced synchronization signal (eSS) or a reduced CRS. The TRS may be transmitted in specific subframes (e.g., a subframe 0 and a subframe 5) of one NCT frame. The TRS may be a reference signal defined in such a way as to be transmitted in an RE specified in a specific RB of the NCT subframe.

In the NCT subframe, PDSCH data may not be mapped to an RE in which the TRS has been configured. That is, in the NCT subframe, data rate matching may be performed on PDSCH data by taking an RE in which a TRS has been configured into consideration. Another NCT subframe may be a subframe obtained by puncturing an RE in which a TRS has been configured.

An antenna port for transmitting a TRS may be defined as an antenna port x. When a BS transmits a TRS to a wireless device based on the antenna port x, the BS may not map the data of a PDSCH or EPDCCH in an RE that corresponds to the antenna port x through which the TRS is transmitted.

An initial value of a pseudo random sequence used for generating a TRS may be determined based on $c_{init}=2^{10} \cdot (7 \cdot (n_s+1)+l+1) \cdot (2 \cdot N_{ID}^{cell}+1)+2N_{ID}^{cell}+N_{CP}$. Herein, $n_s$ may be a slot number, l may be an OFDM symbol number, $N_{ID}^{cell}$ may be a cell identifier, and $N_{CP}$ may be the length of a CP. $N_{CP}$ may have a different value depending on the type of CP.

A v-shift can be used as a parameter for reducing the influence of inter-cell interference. The v-shift may be used as a parameter for coordinating the position of an RE to which a TRS is mapped. For example, the v-shift can be determined based on $v_{shift}=N_{ID}^{cell} \bmod 6$. The v-shift may be a fixed value, such as 0.

In the embodiments of the present invention, for example, the case that a P-cell is a macro cell and an S-cell is a small cell may be considered. Based on the region in which a BS covers, for example, the macro cell is set to the P-cell and the small cell is set to the S-cell, and a network may be operated. The BS may be classified into a macro BS, a pico BS, a femto BS, etc. depending on a size of the covering region. For example, the macro BS is commonly used BS, and has wider coverage than the pico BS or the femto BS. Accordingly, the macro BS may use relatively higher power than the pico BS. The pico BS may cover a small region for a hotspot or a coverage hole, etc. Generally, a pico BS may use relatively lower power than the macro BS. Thus, the pico BS may have lower connection reliability than the macro BS. Like the pico BS and the femto BS, a cell which is provided by a smaller BS may be called the small cell. The small cell may indicate a cell having relatively small coverage based on the coverage of BS. In a situation in which the macro BS (or the macro cell) and the small BS (or the small cell) coexist, various methods may be used for using a network more effectively. For example, according to a load situation of the macro BS, a network load may be controlled and efficiency may be increase by using a method for offloading traffic to the small cell.

Hereinafter, in the embodiments of the present invention, in case that the P-cell is a macro cell and the S-cell is a small cell and a wireless device moves between the small cells, a method for cell switching between the S-cells will be described. In case that a size of cell is small such as in a small cell, inter-cell movements of a wireless device may frequently occur. Accordingly, the amount of data traffic which is signaled for switching cells when a wireless device moves may be increased. Hereinafter, in the embodiments of the present invention, a cell switching method will be described in order to decrease the amount of data traffic effectively in case that a cell switching is occurred in a small cell. A macro cell introduced in the embodiments of the present invention may indicate a P-cell and a small cell may indicate an S-cell below.

Figure 14:
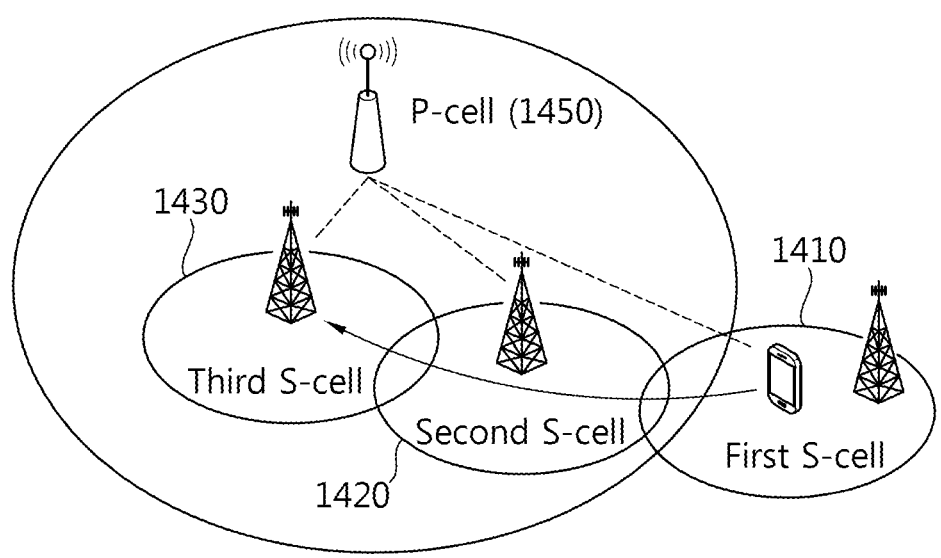
FIG. 14 is a conceptual diagram showing a small cell arrangement according to an embodiment of the present invention.

FIG. 14 is a conceptual diagram showing a small cell arrangement according to an embodiment of the present invention.

Referring to FIG. 14, a plurality of S-cells 1410, 1420 and 1430 may be sequentially existed in one P-cell 450. For example, in case that a wireless device is existed in a space that moves fast like in a subway train, the wireless device is needed to switch the S-cell that serves the wireless device with moving fast between the congested plurality of S-cells 1410, 1420 and 1430. In this case, it is required that the S-cell 1410 serving the wireless device is switched without high delay and overhead.

In an embodiment of the present invention, an identical cell identifier may be shared between the candidate cells 1420 and 1430 of the S-cell in which a switching is performed for switching the S-cell 1410 that serves the wireless device without high delay and overhead. By using this method, even in case that the wireless device does not know the identifiers of the individual S-cells 1410, 1420 and 1430 that separately performs switching, the wireless device may perform switching among the S-cells 1410, 1420 and 1430. This method may also be called a (semi-) UE transparent S-cell switch.

In case of performing cell switching among the S-cells 1410, 1420 and 1430 in the existing network, the process of reconfiguring the S-cells 1410, 1420 and 1430 in a BS of the P-cell 1450 was required whenever a wireless device switches the S-cells 1410, 1420 and 1430. Generally, the reconfiguring the S-cells 1410, 1420 and 1430 may include (1) a process of measuring an intra (or inter)-frequency for distinguishing a new cell, (2) a process of deactivating/removing the current S-cell 1410, and (3) a process of adding new S-cell 1420. Such a process of reconfiguring the S-cell of the BS of P-cell 1450 may not be effective when the wireless device moves fast among the plurality of S-cells 1410, 1420 and 1430 because of high latency and overhead. For example, the case may be assumed that the P-cell 1450 and the S-cells 1410, 1420 and 1430 are intra-BS (for example, an antenna group that physically forms a group, such as a remote radio head (RRH)). In this case, when transmitting inter-cell information, the RRC reconfiguration of BS may be performed with the S-cell 1410 that serves the wireless device being switched since it has relatively low latency and low overhead. However, like the case that the P-cell 1450 and the S-cells 1410, 1420 and 1430 are connected by a wireless backhaul, in an inter-BS situation, the information which is transmitted between the S-cell 1410 and 1420 which are switched may have high latency and high overhead. Accordingly, with the S-cell 1410 that serves the wireless being switched, it is required to perform S-cell switching through different method instead of the method that a BS reconfigures the RRC.

In another method for performing switching between S-cells in the existing network, a plurality of candidate cells for the S-cell which is switched like a first S-cell 1410, a second S-cell 1420 and a third S-cell 1430 is configured and the S-cells 1410, 1420 and 1430 may be activated with a wireless device being moved between cells. However, since a plurality of candidate cells is unable to be configured when the wireless device supports only an aggregation for two CCs, such a method is unable to be used.

In the embodiments of the present invention, a method of determining the S-cells 1410, 1420 and 1430 is introduce to optimally serve a wireless device in a given time in the P-cell 1450 without definite signaling of the wireless device. Hereinafter, in the embodiments of the present invention, the S-cell which is able to optimally serve a wireless device by performing inter-cell switching is called a switching S-cell. In more detail, in the present invention, (1) a method for sharing identical cell identifier between candidate S-cells and (2) a method for performing the HARQ process in case of the S-cell is switched. The present invention may be more effective in S-cell switching that occurs in case that inter-site carrier aggregation is performed as different BSs in which the P-cell and the S-cell are physically away. In such a case, it may be assumed that an interface between the P-cell and the S-cell may be X2 interface.

Figure 15:
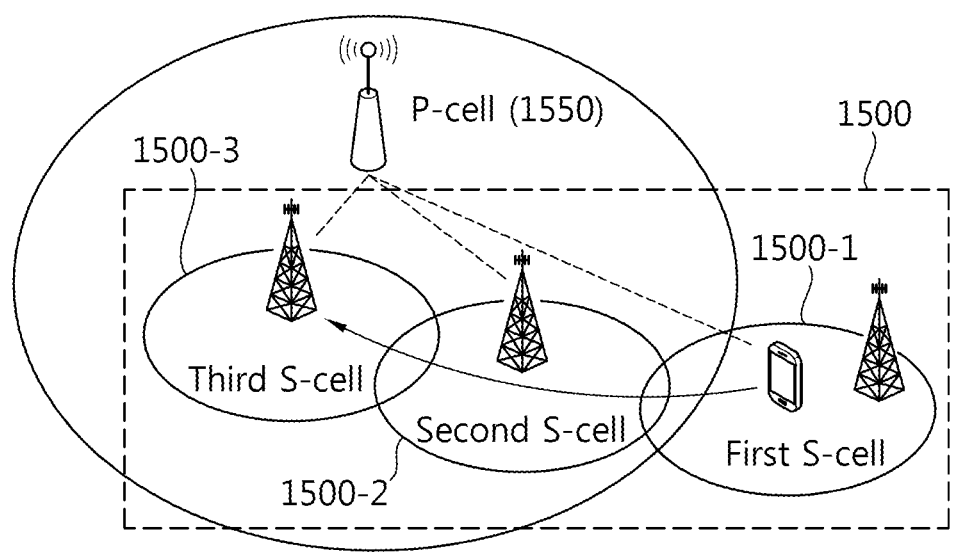
FIG. 15 is a conceptual diagram showing a method for cell switching according to an embodiment of the present invention.

FIG. 15 is a conceptual diagram showing a method for cell switching according to an embodiment of the present invention.

Referring to FIG. 15, in order to perform UE-transparent S-cell switching, a plurality of S-cells may used an identical cell identifier. Candidate S-cells 1500-2 and 1500-3 are the cells included in an S-cell group 1500, and may be candidates of switching S-cell for serving a wireless device. The S-cells 1500-1, 1500-2 and 1500-3 included in the S-cell group 1500 may share an identical cell identifier. In addition, S-cell configuration/deconfiguration may be performed as a basis of S-cell group 1500, and the S-cells 1500-1, 1500-2 and 1500-3 included in the S-cell group 1500 may be configured and deconfigured in an S-cell basis. A P-cell 1550 may perform a configuration and a management for the S-cell group 1500. Furthermore, the P-cell 1550 may determine a switching S-cell among the candidate S-cell 1500-2 and 1500-3. Although the cell that determines the switching S-cell among the candidate S-cells 1500-2 and 1500-3 may also be another cell (a decision cell), not the P-cell 1550, it is assumed to be P-cell for the convenience of description in the embodiments of the present invention below.

The first S-cell 1500-1, the second S-cell 1500-2 and the third S-cell 1500-3 may share an identical cell identifier. In an embodiment of the present invention, it may be assumed that a carrier of the S-cell included in the S-cell group 1500 shares an identical center frequency and the S-cells 1500-1, 1500-2 and 1500-3 included in the S-cell group 1500 is synchronized. The p-cell 1550 which is a macro cell and the S-cells 1500-1, 1500-2 and 1500-3 may be setup to a wireless device. The S-cell group 1500 setup to the wireless device may include one S-cell, and individual S-cell or a plurality of S-cells may be setup to the wireless device.

For example, a BS of the S-cells 1500-1, 1500-2 and 1500-3 may perform a measurement for a channel based on a signal (i.e., the PRACH) that the wireless device periodically transmits to the S-cell 1500-1 which is currently activated. The preamble index of the PRACH that the wireless device transmits to the S-cell 1500-1 may be the same as the preamble index of the PRACH that the wireless device previously transmitted to the S-cell 1500-1. If there is no PRACH previously transmitted to the S-cell 1500-1, the preamble index of the PRACH transmitted to the S-cell 1500-1 may be the same as the preamble index of the PRACH which is previously transmitted to the P-cell 1550. The S-cells 1500-1, 1500-2 and 1500-3 included in the S-cell group 1500 receive a channel and/or a signal transmitted from the wireless device, and the wireless device may determine the optimal S-cell which is to serve the wireless device based on the received channel and/or signal. This will be described below in detail.

The S-cells 1500-1, 1500-2 and 1500-3 included in the S-cell group 1500 share an identical cell identifier. Accordingly, a wireless device may not distinguish each of the S-cells 1500-1, 1500-2 and 1500-3 included in the S-cell group 1500 based on the identifier. Thus, in the aspect of intra/inter-frequency radio resource management (RRM), a wireless device may transmit one RRM report, not a plurality of RRM reports for the individual S-cells 1500-1, 1500-2 and 1500-3 to a BS. The RRM may include methods for managing radio resources in wireless communication environments. For example, based on the data transmitted through a downlink channel, a wireless device may transmit whether to perform MCS, handover and information of transmission power to a BS through the RRM report. If the S-cell that transmits data and/or signals to a wireless device through downlink is plural, the wireless device may generate the RRM report based on the strongest signal among the signals transmitted to the wireless device from the plurality of S-cells.

That is, according to the embodiments of the present invention, since the S-cells 1500-1, 1500-2 and 1500-3 included in the S-cell group 1500 share an identical center frequency and cell identifier, a wireless device may not distinguish the cells based on the identifier. Accordingly, the wireless device may transmit the determined RRM report to a BS based on the strongest signal which is received. If there is a plurality of activated S-cells, the signals such as PSS/SSS/CRS transmitted by the plurality of S-cells may be overlapped. In this case, the RRM report that a wireless device transmits to a BS may be inaccurate. Thus, signals may be boosted in an aspect of a wireless device.

Figure 16:
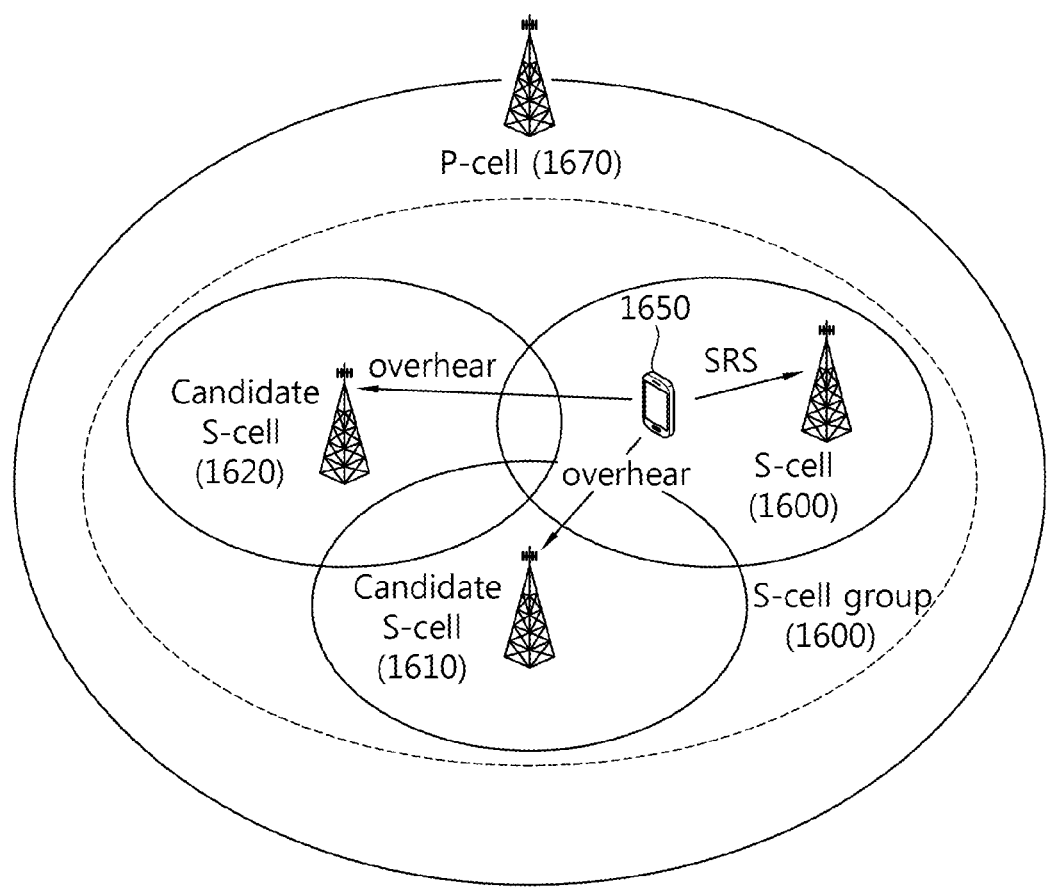
FIG. 16 is a conceptual diagram showing a method for selecting optimal cell to switch according to an embodiment of the present invention.

FIG. 16 is a conceptual diagram showing a method for selecting optimal cell to switch according to an embodiment of the present invention.

Referring to FIG. 16, a BS of a P-cell 1670 may determine a switching S-cell to switch a wireless device 1650 among a plurality of S-cells 1610, 1620 and 1630 included in an S-cell group 1660 without requesting additional measurement to the wireless device. When the candidate S-cells 1610 and 1620 that can be determined as the switching S-cell are called a candidate S-cell, a BS of the candidate S-cells 1610 and 1620 may measure uplink channel information (i.e., a path-loss) based on signals and data (i.e., the SRS, the PUSCH and the PRACH) transmitted to the activated S-cell through the uplink channel by a wireless device. The uplink channel information which is measured in the candidate S-cells 1610 and 1620 may be reported to the P-cell 1670.

When a wireless device transmits data and/or signals through the uplink channel to the currently activated S-cell 1600, the candidate S-cells 1610 and 1620 may overhear the uplink data and/or signals that the wireless device 1650 transmits to measure the pass-loss of uplink. Since the candidate S-cells 1610 and 1620 share an identical center frequency, the candidate S-cells 1610 and 1620 may overhear the SRS which is transmitted from the wireless device 1650 through the S-cell uplink.

When a duplexing mode is the FDD, the measurement value of uplink path-loss measured by the candidate S-cells 1610 and 1620 may be used as an anticipation value of downlink path-loss of the candidate S-cells 1610 and 1620. If any of the S-cells are not activated, the P-cell 1670 may offload traffic to the S-cell by activating an S-cell in case of need (i.e., a case that large data traffic occurs).

As a method for determining an optimal S-cell that the wireless device 1650 is to switch among another plurality of candidate S-cells 1610 and 1620, it may be implemented that the P-cell 1670 requests the S-cell 1600 in which other candidate S-cells 1610 and 1620 are activated, and requests to transmit uplink data for anticipating path-loss to the wireless device 1650. In order to determine a switching S-cell in the P-cell 1670, the wireless device 1650 may perform transmission request of uplink data and/or signals through the uplink to the currently activated S-cell 1600 such that the P-cell 1670 can perform the path-loss anticipation between the candidate S-cells 1610 and 1620. For example, the P-cell 1670 may command the wireless device to transmit the PRACH to the activated S-cell 1600 through the PDCCH of the P-cell 1670 or the S-cell 1600.

By using a method for selecting an optimal S-cell that the wireless device 1650 is to switch among still other plurality of candidate S-cells 1610 and 1620, the wireless device may also select an S-cell initially that will perform an activation based on position information of the wireless device.

That is, in the existing handover method, a reference signal received power (RSRP)/a reference signal received quality (RSRQ) are used, which are measured in order to perform inter-cell handover. However, in a cell switching method according to an embodiment of the present invention, a BS of the P-cell 1670 may use the uplink channel information (i.e., path-loss information) that the candidate S-cells 1610 and 1620 anticipate to determine an optimal cell to perform switching by the wireless device. If the optimal cell that the BS of the P-cell 1670 determines based on the uplink channel information anticipated by the S-cells 1610 and 1620 is not the same as the S-cell which is currently associated with the wireless device, switching S-cell may be performed.

In a BS of each candidate S-cells 1610 and 1620, system information of the candidate S-cells 1610 and 1620 as well as the uplink channel information anticipated as the BS of the P-cell 1670 may also be additionally transmitted. The system information of the candidate S-cells 1610 and 1620 as well as the uplink channel information that the S-cells 1610 and 1620 transmit may also be considered in order for the P-cell 1670 determine the switching S-cell.

For example, the BS of the candidate S-cells 1610 and 1620 may additionally transmit the system information such as a traffic load, a buffer state, information of a number of wireless device serving in a cell, etc. Particularly, in case such as an inter-site CA, since information is not shared between the BS of the S-cells 1610 and 1620 and the BS of the P-cell 1670, such information may be transmitted from the BS of the S-cells 1610 and 1620 to the BS of the P-cell 1670 through an inter-cell interface. The P-cell 1670 may consider the received system information of the candidate S-cells 1610 and 1620 and the uplink channel information (i.e., path-loss) in order to select the switching S-cell. As described above, in case that accuracy of the position of wireless device is permitted, as the information that the P-cell 1670 determines the switching S-cell, the position information of the wireless device 1650 may additionally considered.

That is, each cell may monitor the wireless device 1650 which is setup to at least one cell included in the same S-cell group 1660 (for example, whenever the call may be activated).

In order for the candidate S-cells 1610 and 1620 to effectively measure a quality of the uplink channel, the candidate S-cells 1610 and 1620 should know the information of channel and/or signal that the wireless device 1650 transmits to the activated S-cell 1600 through the uplink channel. The information of channel and/or signal of the wireless device 1650 that the candidate S-cells 1610 and 1620 should know are as follows.

(1) The information of a period, an offset and a sequence of the uplink signal/channel (i.e., a periodic SRS, a SPS PUSCH, etc.) that the candidate S-cells 1610 and 1620 use for quality measurement.

(2) A type of the uplink signal/channel (i.e., an SRS, a PUCCH format, an SPS PUSCH, etc.)

(3) The information (a DM-RS parameter, an allocated resource, a PUCCH index, etc.) that enables data decoding Each of the candidate S-cells 1610 and 1620 may receive the information for decoding data received through the uplink channel by the activated S-cell 1600. For example, the information required in the candidate S-cells 1610 and 1620 may be transmitted through an inter-BS interface (for example, X2 interface) if the candidate S-cells 1610 and 1620 and the activated S-cell 1600 are inter-BS. Furthermore, if the candidate S-cell and the activated S-cell are intra-BS, the information may be exchanged through an intra-BS interface (for example, an interface between a macro BS and the RRH).

As a method for increasing the measurement performance in the candidate S-cells 1610 and 1620, the wireless device 1650 may be configured to periodically transmit the signals or data specified through the uplink channel. For example, the wireless device 1650 may be configured to periodically transmit the PRACH to the activated S-cell 1600 through the uplink channel. Based on the periodic transmission of the wireless device 1650, the candidate S-cells 1610 and 1620 may anticipate the path-loss by overhearing the PRACH that the wireless device 1650 periodically transmits. In case that the periodic PRACH is used for measuring a wireless device, the P-cell (or a cell that determines the switching S-cell) 1670 may configure a period of PRACH that the wireless 1650 transmits and a PRACH preamble index.

The measurement signal for anticipating the path-loss of the wireless device 1650 may not periodically transmitted to the candidate S-cells 1610 and 1620. In such a case, in order for the wireless device 1650 to anticipate the path-loss for the signal that the wireless device 1650 transmits by transmitting uplink signal, the P-cell 1670 may setup the wireless device 1650 such that the wireless device may transmit the uplink signal to the activated S-cell 1600. For example, the wireless device 1650 may be configured to perform the uplink transmission through the PDCCH transmitted in the P-cell 1670 or the wireless device 1650 may be triggered to transmit non-periodic SRS.

As described above, in order to successfully decode the uplink data that the wireless device 1650 transmits, the information of uplink transmission of the wireless device 1650 to the candidate S-cells 1610 and 1620 from the P-cell 1670 or the activated S-cell 1600 through the intra-BS interface or the inter-BS interface. The information of uplink transmission of the wireless device 1650 may be, for example, a sequence that generates data transmitted by the wireless device 1650 and/or signal, a resource allocated to the wireless device 1650 to perform the uplink transmission by the wireless device 1650, a hoping pattern of the wireless device 1650, etc.

As another method for increasing the measurement performance of the candidate S-cells 1610 and 1620, the channel or resource used for the candidate S-cells 1610 and 1620 to anticipate the path-loss may be predetermined. For example, it may be assumed that the resource used for the candidate S-cells 1610 and 1620 to anticipate the path-loss is the PRACH that the wireless device 1650 transmits. The BS of the P-cell 1670 may predetermine the PRACH preamble index information, the PRACH transmission period information and the information of the PRACH resource used for the purpose of wireless device measurement, and transmit these to the candidate S-cells 1610 and 1620. The candidate S-cells 1610 and 1620 may anticipate the path-loss for the uplink channel based on the information of PRACH which is predetermined to be transmitted by the wireless device 1650.

The uplink channel and/or signal predetermined by the BS of the P-cell 1670 in order for the candidate S-cells 1610 and 1620 to anticipate the path-loss is not required to be limited to the PRACH. For example, The SRS of a specific configuration that the wireless device 1650 transmits may be used as the resource for performing the uplink channel measurement by the candidate S-cell. The P-cell 1670 may determine the configuration of the uplink channel and/or the signal that the candidate S-cells 1610 and 1620 perform the uplink channel anticipation. The P-cell 1670 may transmit the configuration information for the determined uplink channel and/or signal to the wireless device 1650. In addition, the P-cell 1670 may transmit the configuration information of the uplink channel and/or signal to the candidate S-cells 1610 and 1620 as well as the wireless device. The wireless device 1650 may transmit the uplink channel and/or signal configured by the P-cell BS 1670. Since the candidate S-cells 1610 and 1620 know the uplink channel and/or signal configured by the P-cell BS 1670, based on this, the candidate S-cells 1610 and 1620 may overhear the uplink channel and/or data transmitted by the wireless device 1650.

The candidate S-cells 1610 and 1620 may overhear the uplink transmission for anticipating a quality of the downlink channel. If the measurement result exceeds a given threshold value, the candidate S-cells 1610 and 1620 may report the measurement result for each wireless device 1650 periodically. The P-cell 1670 may configure the method for reporting the measurement performed by the candidate S-cells 1610 and 1620. For example, the configuration of reporting method such as a reporting period, a threshold value or measurement period/gap, etc. may be determined by the P-cell 1670. The P-cell 1670 may transmit the configuration of the method for reporting the result measured by the candidate S-cells 1610 and 1620 to the candidate S-cells 1610 and 1620 through the X2 interface or the intra-eNB interface.

The threshold value for reporting the measurement result by the candidate S-cells 1610 and 1620 may be a value which is semi-statically changed value by the P-cell 1670 or a predetermined value. The information of the uplink channel state which is transmitted by overhearing the uplink channel by the candidate S-cells 1610 and 1620 may include a variety of information. For example, the information of the uplink channel state may include a path-loss anticipation value, a power of received signal and/or the SNR. In addition, the information of the uplink channel state that the wireless device 1650 transmits may also be an absolute value of the signal strength overheard, a quantized value of the signal strength overheard, or a level of the received signal overheard which is obtained and prepared for a level of other received signal, etc. Such a value may be a mean value or a filtering value of the signal overheard on a plurality of timings, not an instant value. The section of obtaining mean value and the filter parameter used for obtaining the mean value or the filtering value may be a value that the P-cell 1670 configures to the candidate S-cells 1610 and 1620 beforehand or a fixed value.

Hereinafter, in the embodiments of the present invention, a method for S-cell switching that performs cell switching in case that a P-cell determines an S-cell which is different from the S-cell currently activated to a switching cell.

As a first method for performing S-cell switching, a non-UE transparent S-cell switching may be used. The non-UE transparent S-cell switching is a method of performing configuration alteration according to a cell switch with a wireless device knowing generation of cell switching.

A second method for S-cell switching is a UE-transparent S-cell switching. The UE-transparent S-cell switching is a method of performing configuration alteration with a wireless device not knowing whether a cell switching is generated or not.

Figure 17:
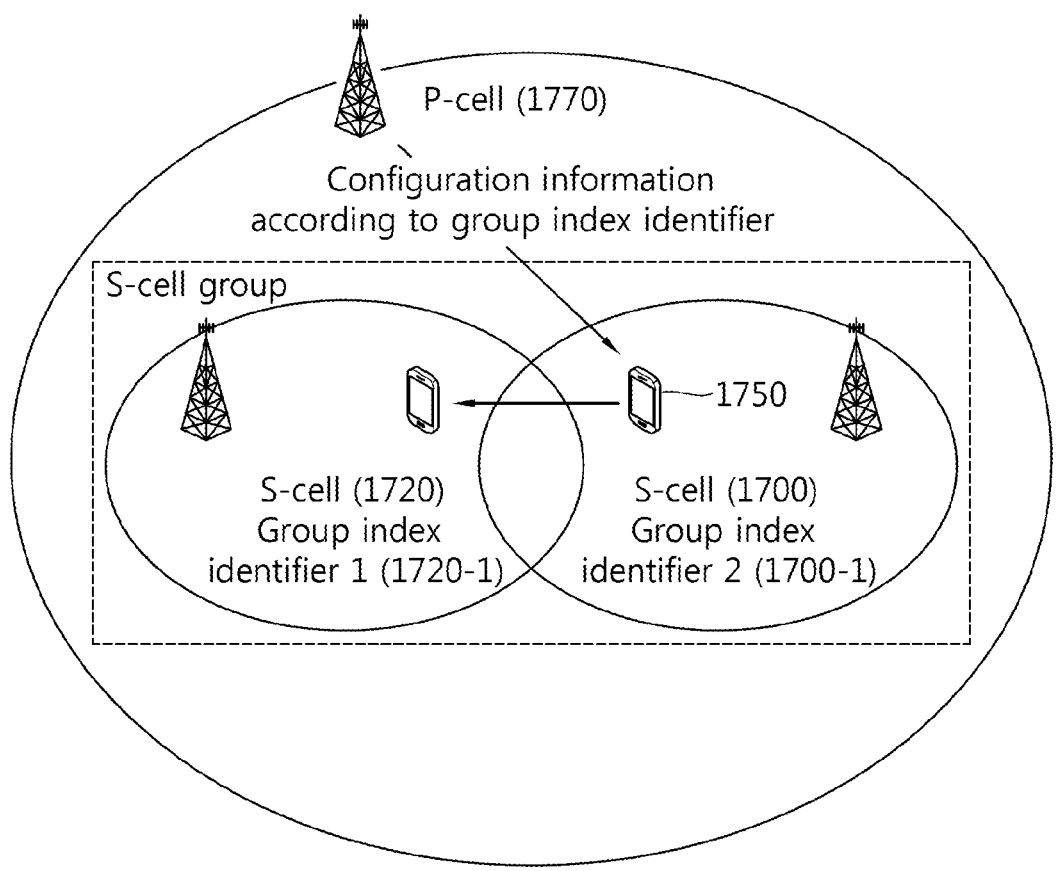
FIG. 17 is a conceptual diagram showing a non-UE transparent S-cell switching method of a wireless device 1750 according to an embodiment of the present invention.

FIG. 17 is a conceptual diagram showing a non-UE transparent S-cell switching method of a wireless device 1750 according to an embodiment of the present invention.

Referring to FIG. 17, in performing a non-UE transparent S-cell switching, S-cells 1700 and 1720 of the same S-cell group that performs the S-cell switching may share a center frequency. However, a system frequency band, cell configuration information (i.e., a legacy carrier type (LCT), and a new carrier type (NCT), PSS/SSS/TRS period/offset, etc) of the S-cells 1700 and 1720 belong to the same S-cell group may be different. When the cell configuration information of the S-cells 1700 and 1720 included in the S-cell group is different, the information of cell configuration for the switched S-cell 1720 should be transmitted to each wireless device 1750. The S-cells 1700 and 1720 are distinguished by indexes and the information of cell configuration for each index may be transmitted to the wireless device. The index for distinguishing the S-cells 1700 and 1720 included in the S-cell group within the group may be called group index identifiers 1700-1 and 1720-1. The group index identifier 1700-1 and 1720-1 may correspond to the S-cell configuration information that the wireless device 1750 should know for being operated in the switched S-cell 1720.

For example, the S-cell group is setup to the wireless device 1750, the group index identifiers 1700-1 and 1720-1 of the S-cells 1700 and 1720 included in the S-cell group and the S-cell configuration information that corresponds to the group index identifiers may be signaled to the wireless device 1750 using the RRC. When the S-cell is switched, the wireless device 1750 may setup the wireless device 1750 based on an index of the switched S-cell 1720. If the RRC reconfiguration is used for switching the S-cell, a high latency may occur in cell switching since the latency of the RRC reconfiguration is high. Accordingly, the wireless device 1750 receives the group index identifiers 1700-1 and 1720-1 of the S-cells 1700 and 1720 included in the S-cell group and the S-cell configuration information that corresponds to the group index identifiers 1700-1 and 1720-1 through the RRC, and may perform cell switching even though not performing the RRC reconfiguration. The latency occurred due to the cell switching may be decreased by not performing the RRC reconfiguration when performing the cell switching. For example, in case that a wireless device moves from a cell to another cell, like the case that the wireless device moves between a plurality of small cells such as the small cells arranged in an office building or a platform, the latency may be decreased.

Figure 18:
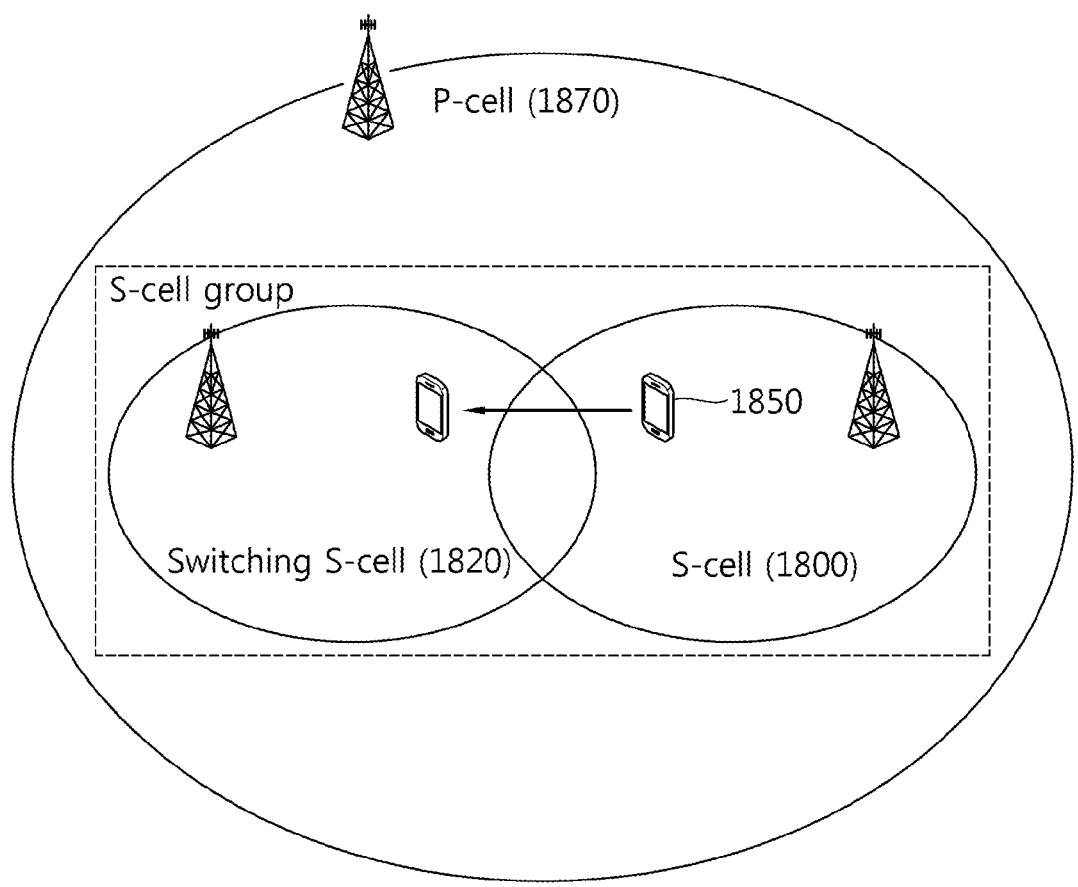
FIG. 18 is a conceptual diagram showing a UE-transparent S-cell switching method of a wireless device according to an embodiment of the present invention.

FIG. 18 is a conceptual diagram showing a UE-transparent S-cell switching method of a wireless device according to an embodiment of the present invention.

Referring to FIG. 18, in a UE-transparent S-cell switching, which is a second method for performing S-cell switching, S-cells 1800 and 1820 included in a S-cell group have an identical cell configuration information, thus, the method may be applied to the case that the reconfiguration of a wireless device 1850 is not required according to the switching of the S-cells 1800 and 1820. Since the configuration information of the S-cells 1800 and 1820 included in the S-cell group is identical, the wireless device 1850 is not required to change the configuration information of the wireless device 1850 according to the switching of S-cells 1800 and 1820. A BS of a P-cell 1870 may select one S-cell among the candidate S-cells as the switching S-cell 1820 based on the uplink channel state information of the S-cell candidates, and the switching S-cell 1820 may perform downlink transmission. In the point of view of the wireless device 1850, the wireless device may be operated not performing separate configuration alteration depending on whether the S-cell is switched.

According to an embodiment of the present invention, the uplink signal that a wireless device transmits is overheard by a candidate S-cell, and after the channel state information is measured, the measured candidate S-cell may report the measured channel state information to a P-cell. As another method, a wireless device may also report the channel state information of each candidate S-cell to a BS of the P-cell based on the downlink channel and/or signal transmitted in each S-cell. In order to support the UE-transparent S-cell switching, cell information may be exchanged between the P-cell 1870 and the candidate S-cells 1800 and 1820. If the physical cell identifiers of the two candidate S-cells 1800 and 1820 is identical, the wireless device may not distinguish the candidate S-cells based on the physical cell identifiers. Accordingly, the channel state measurement value for the two candidate S-cells may be reported as one value. The P-cell 1870 may differently configure the configuration for the downlink channel and/or signal that the candidate S-cells transmit in order to select the switching S-cell among the candidate S-cells 1820 and 1800. For example, by differently configuring two different CSI-RS or CSI-RS measurement set for each of the S-cells, and the wireless device may report the information of the downlink signal/channel measured based on this. The configuration for the method for reporting the measured channel state information may be transmitted to the candidate S-cells 1800 and 1820 through the X2 or intra-BS interface.

As another method, when the UE-transparent S-cell switching is supported, the S-cell that does not support the wireless device currently among the S-cells 1800 and 1820 included in the S-cell group may not transmit a specific downlink channel or downlink signal in order to increase the channel state measurement accuracy of the wireless device. For example, when the S-cell 1800 and the wireless device are connected, since the S-cell 1820 does not transmit the common channel with the CRS and other S-cells before the wireless device switches, the channel state measurement accuracy of the wireless device may be increased. For example, in case that the channel state between the wireless device and the S-cell that the wireless device is connected, other candidate S-cells perform the CRS or cell common channel transmission in SFN method. Thus, the probability of the wireless device being signaled and signal quality may be increased. In order to support such a method, the P-cell may enable/disable the cell common channel transmission of the candidate S-cells, or start each cell by transmitting it to the S-cell candidates through the X2 interface or other interface.

According to an embodiment of the present invention, the non-UE transparent S-cell switching may be performed through a random access process based on the PDCCH command.

Figure 19:
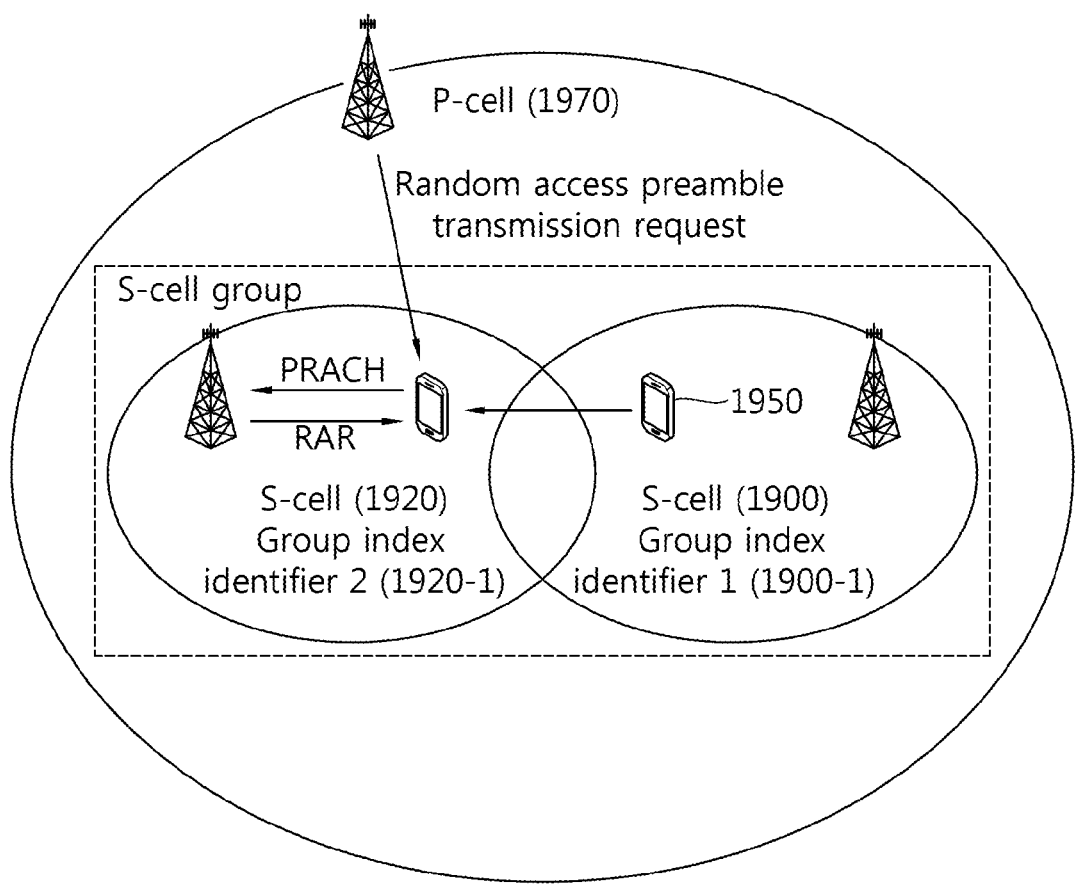
FIG. 19 is a conceptual diagram showing a non-UE transparent S-cell switching method according to an embodiment of the present invention.

FIG. 19 is a conceptual diagram showing a non-UE transparent S-cell switching method according to an embodiment of the present invention.

Referring to FIG. 19, an S-cell random access process may be used for one S-cell 1900 to be switched to another S-cell 1920. A BS of a P-cell 1970 may command to transmit a random access preamble for the S-cell switching to a wireless device 1950 through the PDCCH. The S-cell switching command that the BS of the P-cell 1970 transmits through the PDCCH may be determined based on a preamble index of the random access preamble. When transmitting the S-cell switching command to the wireless device 1950, the BS of the P-cell 1970 may specify an index of the random access preamble that the wireless device 1950 will use. According to an embodiment of the present invention, in case of performing the S-cell switching, as in index of the random access preamble, only a predetermined index may be used. The random access preamble used for such an S-cell switching is defined and used as an S-cell switching preamble index. Accordingly, in case that an index of the random access preamble that the BS of the P-cell 1970 explicitly notifies is the S-cell switching preamble index, the wireless device 1950 may notice that the S-cell switching is performed.

Accordingly, in case that the wireless device 1950 receive the PDCCH command related to the S-cell switching preamble index and at least one S-cell is setup to the wireless device 1950, the wireless device 1950 may assume that the S-cell switching is performed. A group index identifier 1920-1 of the switched S-cell 1920 may be transmitted using a bit which is reserved in format 1A for allocating compact scheduling of the PDSCH codeword (the corresponding bit is set to 0 in a general PDCCH command).

After performing the S-cell switching, the wireless device 1950 may receive the downlink channel data and the downlink signal transmitted in the switching S-cell 1920 based on the group index identifier 1920-1 of the switching S-cell 1970.

The wireless device 1950 may receive the cell configuration information (i.e., the cell configuration information different from that of S-cell before being switched) for the switching S-cell 1920 from a BS of the switching S-cell 1920. For example, the switching S-cell 1920 may transmit the cell configuration information of the switching S-cell 1920 to the wireless device 1950 through a random access response (RAR) message as a response to the S-cell switching preamble that the wireless device 1950 transmits. In case that the random access process of the wireless device 1950 is completed, the BS of the switching S-cell 1920 and the wireless device 1950 may assume that the cell switching is successfully performed. When the cell switching is successfully performed, the system information may be updated by assuming an SIB of a new cell is in a state that an SIB update trigger occurs. If the S-cell has an SIB-linked uplink, an uplink power control for the new cell may be reset. An initial power may be setup through the random access process. In case that it is not available to perform signaling of the cell configuration information of the S-cell in the S-cell group beforehand, individual messages (L2/L1 message) for transmitting cell configuration information such as the RAR message may also be considered.

As described above, as another method for performing S-cell switching, a UE-transparent S-cell switching may be used. The UE-transparent S-cell switching may switch the S-cells in a cell group without clear wireless device signaling. In such a case, a BS may be switched from one cell to another cell while maintaining all states (i.e., HARQ buffer, timing, etc.). The UE-transparent S-cell switching may be performed in case that the S-cells have identical cell configuration information such that a configuration alteration for the wireless device is not required. Even in this case, for the uplink synchronization for the new cell, the BS may request to transmit the PRACH to the wireless device through the PDCCH command.

According to the embodiments of the present invention, when performing S-cell switching, a hard S-cell switching method or a soft S-cell switching method may be used. In case that the hard S-cell switching is used between a wireless device and a BS, the HARQ buffer and state are reset, and all power controls and the RRC configuration may fall back to default values. In case that the soft S-cell switching is used between a wireless device and a BS, for example, the state information including the HARQ process (ACK/NACK and reconfiguration) and the uplink power configuration may be forwarded to a new cell.

(1) Hard S-Cell Switching

The HARQ process in case of performing the hard S-cell switching between a wireless device and a BS may be performed as follows. For example, when the S-cell is deactivated by an activation/deactivation MAC control element or the PDCCH command, the HARQ buffer may be flushed, and the ACK/NACK state may be reset. Thus, according to an embodiment of the present invention, in case of performing the hard cell switching between the wireless device and the BS, it may be configured to transmit ACK/NACK to the P-cell BS by performing ACK/NACK bundling through the PDCCH command in the P-cell BS before the S-cell is deactivated.

(2) Soft S-Cell Switching

Similar to the soft handover, in the soft S-cell switching method, a switching from one s-cell to another s-cell may be performed while performing the HARQ process forwarding. In order to permit the soft S-cell switching, it is required to cope with the delay (i.e., 16 msec in case that deactivation/reactivation of the S-cell is performed) which is occurred when performing switching cell. Another soft S-cell switching method is a method of deactivating the S-cell that the wireless device previously accesses after the switching S-cell is successfully activated.

In order to sedate the transmission and reception of data and ACK/NACK when performing the soft S-cell switching, the HARQ process may be changed to another new cell (or a P-cell) and performed.

According to an embodiment of the present invention, when performing the soft S-cell switching, in order to smoothly alter the HARQ process and maintain the retransmission state, it may be implemented that ACK/NACK piggy-back is not performed in the PUSCH transmitted in the S-cell. As the method that ACK/NACK piggy-back is not performed in the PUSCH transmitted in the S-cell, it may be implemented that the PUCCH/PUSCH transmission is available as well as the PUCCH is always transmitted through the P-cell simultaneously. Accordingly, if it is not available to simultaneously transmit the PUCCH/PUSCH, in order for the ACK/NACK S-cell PUSCH piggy-back is not available based on the RRC signaling or control information of MAC layer, an additional configuration may be performed. Or it may be assumed that the ACK/NACK S-cell PUSCH piggy-back is not permitted for a wireless device. Thus, according to an embodiment of the present invention, in case of performing the soft S-cell switching, all ACK/NACKs may be transmitted through the P-cell. In addition, in case of performing a retransmission transition, the P-cell may manage the HARQ buffer for the S-cell.

According to an embodiment of the present invention, the HARQ process performed in the P-cell and the S-cell may be operated in the P-cell. Similar to the case that the S-cell uses a frequency band which is not licensed, the P-cell may handle the HARQ process of S-cell as well as that of the P-cell. The P-cell may sequentially perform the HARQ process even in case that frequent S-cell switching occurs by handling the HARQ process performed by the P-cell.

Figure 20:
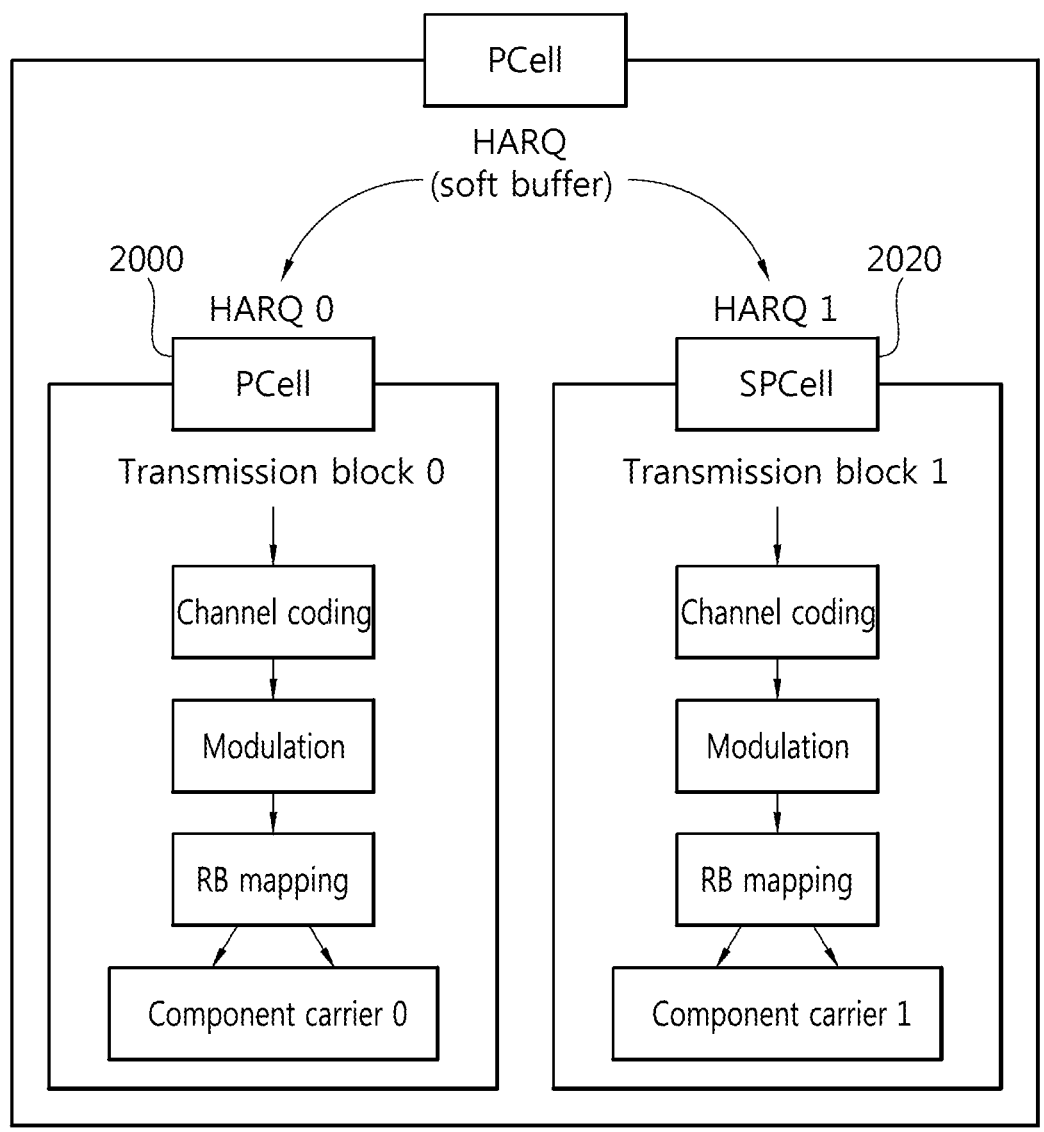
FIG. 20 is a conceptual diagram showing a HARQ process by a P-cell according to an embodiment of the present invention.

FIG. 20 is a conceptual diagram showing a HARQ process by a P-cell according to an embodiment of the present invention.

Referring to FIG. 20, an S-cell 2020 may perform dependent HARQ process based on a P-cell 2000.

It may be assumed that a first HARQ process is performed between the P-cell 2000 and a wireless device, and a second HARQ process is performed between the S-cell 2020 and the wireless device.

In case that the S-cell 2020 is switched, the wireless device may transmit the ACK/NACK for the data transmitted from the S-cell 2020 to the P-cell 2000. The P-cell 2000 may retransmit data to the wireless device based on the ACK/NACK that the wireless device transmits.

Figure 21:
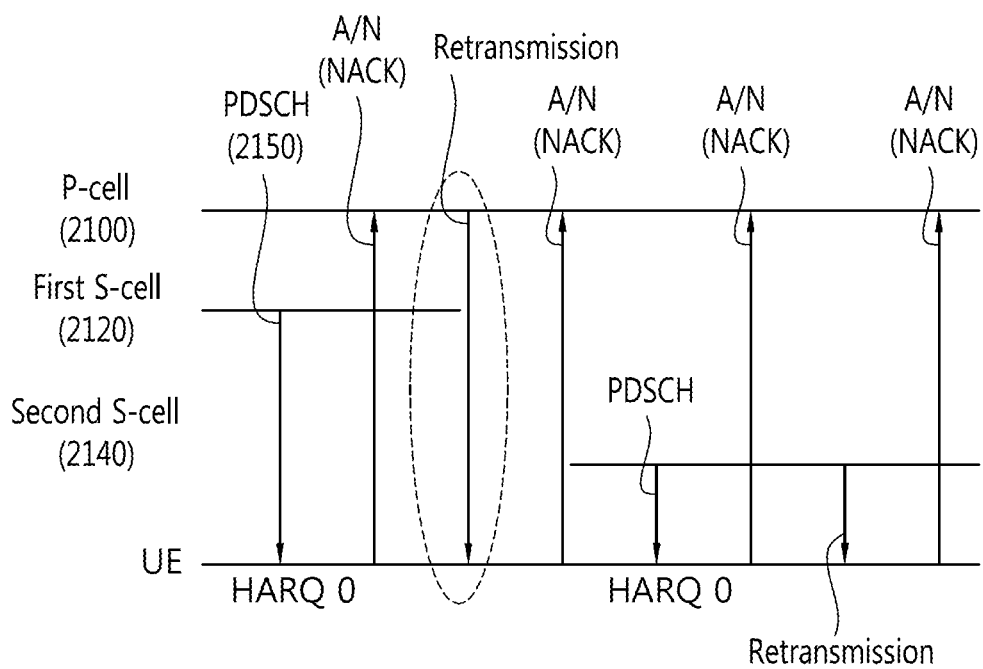
FIG. 21 is a conceptual diagram showing a HARQ process by a P-cell according to an embodiment of the present invention.

FIG. 21 is a conceptual diagram showing a HARQ process by a P-cell according to an embodiment of the present invention.

Referring to FIG. 21, the case of performing S-cell switching from a second S-cell 2140 to a first S-cell 2120 is shown. When an S-cell that serves a wireless device is switched from the second S-cell 2140 to the first S-cell 2120, the ACK/NACK that the wireless device is supposed to transmit to the second S-cell 2140 may be transmitted to the P-cell 2100. For example, in case that the wireless device receives the PDSCH data 2150 from the second S-cell 2140 and the second S-cell is switched, the wireless device may transmit the ACK/NACK for the PDSCH data 2150 that is transmitted by the second S-cell 2140 to the P-cell 2100. The P-cell 2100 may perform retransmission for the PDSCH data 2150 in which an error occurs, based on the ACK/NACK transmitted by the wireless device.

As another method for performing the HARQ process which is different from the method shown in FIG. 21, in case that the S-cell switching is performed, the HARQ process may be performed with a UE-transparent manner. Before performing the s-cell switching, the current S-cell may forward all required information to the switching S-cell through the intra-BS interface or inter-BS interface. In this case, the retransmission operation may be performed by the switching S-cell, not by the P-cell. The wireless device may transmit the ACK/NACK to the switching S-cell, and the switching S-cell may retransmit the data transmitted by the previous S-cell to the wireless device based on the received ACK/NACK.

According to the embodiments of the present invention, an independent HARQ process may be performed between the P-cell and the S-cell.

Figure 22:
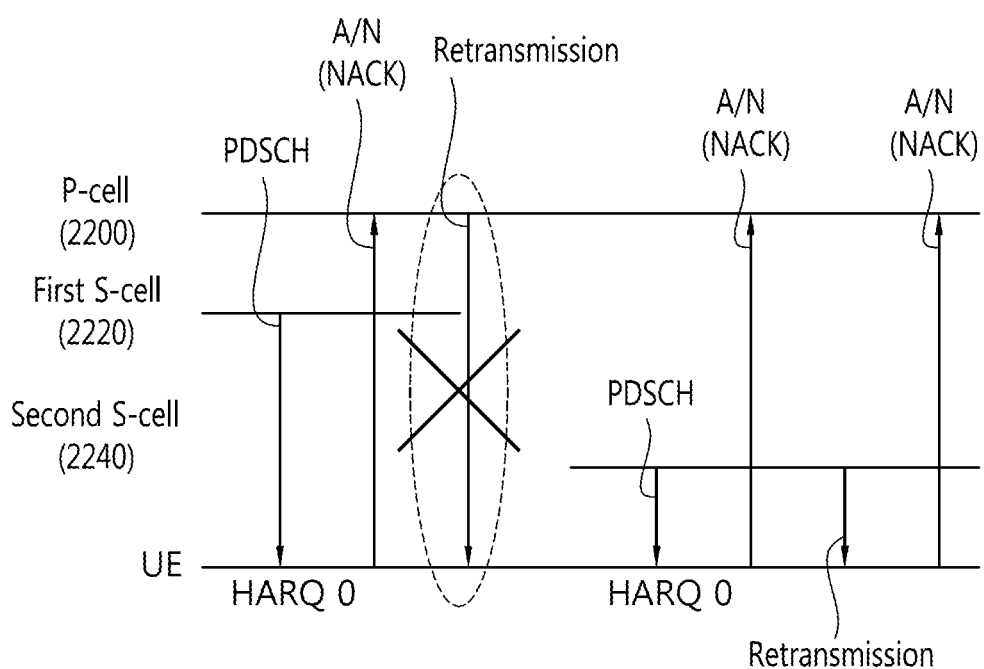
FIG. 22 is a conceptual diagram showing a case that the HARQ process is independently performed between the P-cell and the S-cell according to the embodiments of the present invention.

FIG. 22 is a conceptual diagram showing a case that the HARQ process is independently performed between the P-cell and the S-cell according to the embodiments of the present invention.

Referring to FIG. 22, in case that the HARQ processes are independently performed in the P-cell 2200 and the S-cell 2220 and 2240, the P-cell 2200 is not able to retransmit the data to the wireless device based on ACK/NACK of the wireless device for the data that is transmitted from the first S-cell 2220. In this case, the data may not be retransmitted even in case that the wireless device transmits the NACK.

In case that the identical HARQ process number is used in the newly switched cell, it may be identified by the wireless device whether the data is a new packet or a retransmitted data by toggling a new data indicator (NDI). The NDI is one-bit information that indicates whether the transmission data is for the new transmission or retransmission.

The operation of the wireless device may be performed as below according to UE-transparent S-cell switching and non-UE-transparent S-cell switching.

Assumed a case that the wireless device performs the UE-transparent S-cell switching. In case the wireless device performs the UE-transparent S-cell switching, the wireless device may flush the HARQ buffer and reset the HARQ process in case that the wireless device receives the PDCCH command for the S-cell. In case that a specific signal such as PDCCH command is received by the wireless device which is set by the UE-transparent S-cell switching, the wireless device may recognize that the S-cell switching is occurred. For example, in case that the wireless device determines the S-cell switching to be occurred based on the PDCCH command, the wireless device may determine that the PHICH is not received from the previous S-cell. Also, the wireless device may flush the HARQ buffer judging that the retransmission for the ACK/NACK signal is not available.

Assumed that the wireless device performs the non-UE-transparent S-cell switching.

If the wireless device is set up by non-UE-transparent S-cell switching, the S-cell switching and cell switching may be triggered through the random access procedure as previously described. The wireless device may deactivate the current S-cell and flush the HARQ buffer. The wireless device may activate the switching S-cell.

Hereinafter, the ACK/NACK transmission method will be described according to the embodiments of the present invention.

Figure 23:
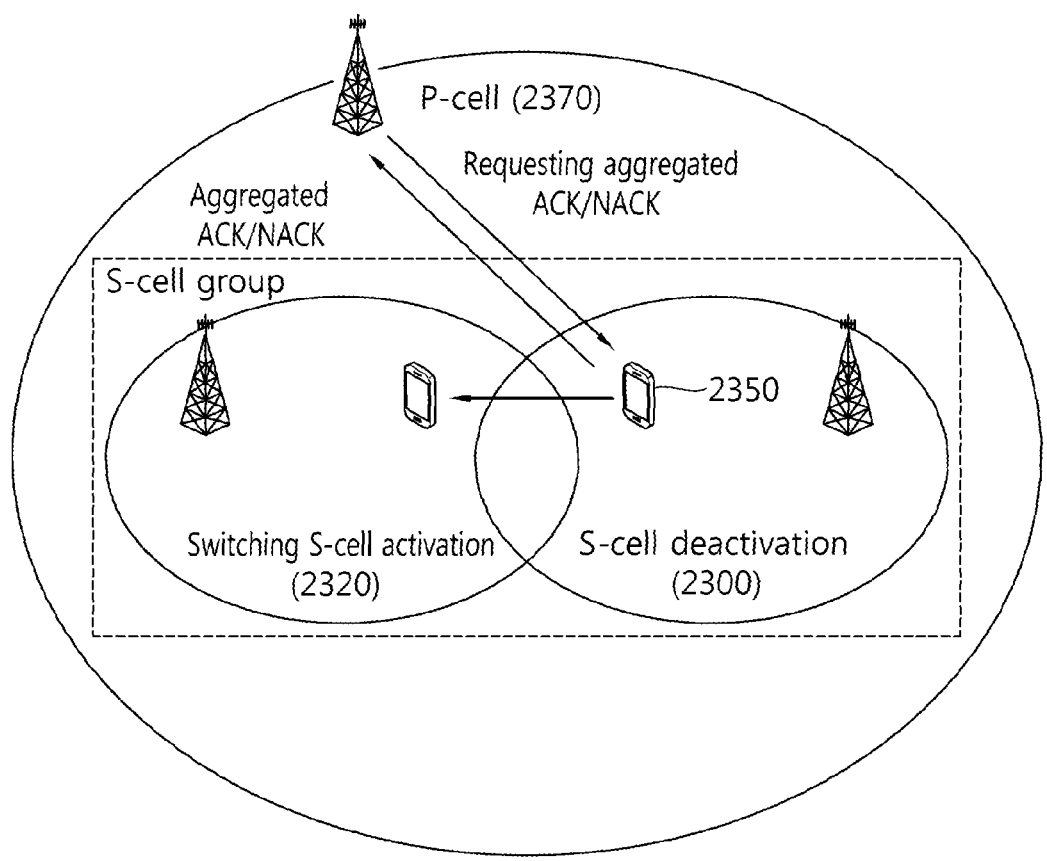
FIG. 23 is a conceptual diagram showing the ACK/NACK transmission method according to the embodiments of the present invention.

FIG. 23 is a conceptual diagram showing the ACK/NACK transmission method according to the embodiments of the present invention.

Referring to the FIG. 23, on the S-cell switching, the BS of the P-cell 2370 may request the ACK/NACK feedback aggregated for the downlink data to which the ACK/NACK signal has not been transmitted yet before the wireless device 2350 deactivates the previously accessed S-cell 2300.

The BS of the P-cell 2370 may transmit the ACK/NACK command through the control channel for requesting the ACK/NACK feedback aggregated for the downlink data to which the ACK/NACK signal has not been transmitted yet. For example, the ACK/NACK feedback may be requested, which is aggregated to the wireless device 2350 by using PDCCH similar to the PDCCH command that performs the RACH request to the wireless device 2350. The BS of P-cell 2370 may generate the ACK-NACK command by using DCI format 1A (or another DCI format). For example, if the DCI format 1A is used, the CRC of the format 1A may scramble to C-RNTI. All of the rest field may give the ACK/NACK command by being set as below.

Localized or distributed VRB assignment flag: set to 0
Resource block index: set to 1
Preamble index: set to 1
PRACH Mask index: set to 1

By setting up the DCI format as mentioned above, it is available to limit on the PDCCH command that indicates the ACK/NACK command not to be allocated the preamble index of '111111' and the PRACH mask index of '1111'.

In case the wireless device 2350 receives the ACK/NACK command in the nth subframe, the aggregated ACK/NACK may be transmitted in subframe n+k (herein, k is more than 4). In case that the BS of P-cell 2370 does not receive the response of the ACK/NACK command (for example, the aggregated ACK/NACK response), it is determined that all packets are lost. In case that the BS of P-cell 2370 does not receive the aggregated ACK/NACK response of the ACK/NACK command, in case that the new switching S-cell 2320 is activated, the ACK/NACK response may be received from and the date that has an error may be retransmitted to the P-cell 2370 or the activated S-cell 2320. The retransmission may be performed in a temporal term through the P-cell 2370 in order to reduce the latency between the activation of the new carrier and the deactivation of the previous carrier.

Figure 24:
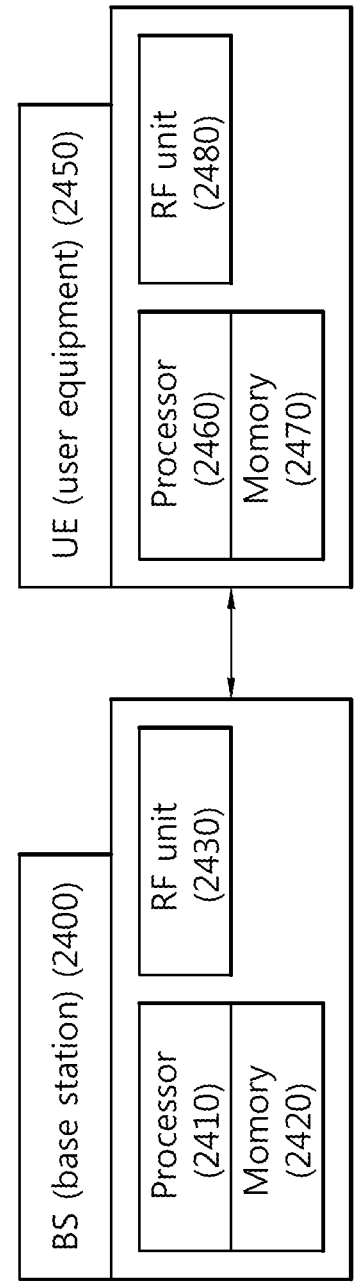
FIG. 24 is a block diagram showing a wireless communication system according to an embodiment of the present invention.

FIG. 24 is a block diagram showing a wireless communication system according to an embodiment of the present invention.

Referring to FIG. 24, a BS 2400 includes a processor 2410, a memory 2420 and a radio frequency (RF) unit 2430. The memory 2420 is connected to the processor 2410 and configured to store various information used for the operations for the processor 2410. The RF unit 2430 is connected to the processor 2410 and configured to transmit and/or receive a radio signal. The processor 2410 implements the proposed functions, processed, and/or methods. In the described embodiments, the operation of BS may be implemented by the processor 2410.

For example, the processor 2410 may activate a secondary (S)-cell, receive channel state information from another S-cell, determine another S-cell as a switching S-cell based on the channel state information, and activate it.

The above S-cells may be included in a S-cell group, an identical physical cell identifier may be setup to the S-cell group, and a set of a plurality of S-cells that operates based on an identical center frequency.

A wireless apparatus 2450 includes a processor 2460, a memory 2470, and a radio frequency (RF) unit 2480. The memory 2470 is connected to the processor 2460 and configured to store various information used for operating the processor 2460. The RF unit 2480 is connected to the processor 2460 and configured to transmit and/or receive a radio signal. The processor 2460 implements the proposed functions, processed, and/or methods. In the embodiments described above, the operation of the wireless apparatus may be implemented by the processor 2460.

For example, the processor 2460 may receive an uplink signal transmission request signal, and transmit an uplink signal to be received by another S-cell and currently activated S-cell.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:
1. A method for performing a cell switching in a wireless communication system, the method comprising:
   activating, by a base station of a primary (P)-cell, a first secondary (S)-cell;
   receiving, by the base station of the P-cell, channel state information from a second S-cell;
   determining, by the base station of the P-cell, the second S-cell as a switching S-cell based on the channel state information; and
   deactivating, the base station of the P-cell, the first S-cell;
   activating, by the base station of the P-cell, the second S-cell; and configuring, by the base station of the P-cell, a transmission of a switching random access preamble as uplink data transmitted to the first S-cell by a wireless device, wherein the switching random access preamble is configured to be transmitted by the wireless device in order to perform the cell switching of the base station of the P-cell, wherein the wireless device determines whether to perform the cell switching based on the switching random access preamble, wherein the first S-cell and the second S-cell are included in an S-cell group, wherein the S-cell group is a set of a plurality of S-cells for which an identical physical cell identifier is configured and operated based on an identical center frequency, wherein the channel state information includes information of a channel which is obtained by overhearing the uplink data that the wireless device transmits to the first S-cell by the second S-cell, wherein the P-cell, the first S-cell and the second S-cell are aggregated by a carrier aggregation, and wherein the first S-cell and the second S-cell are activated by the P-cell.

2. The method of claim 1, wherein the first S-cell transmits information for demodulating the uplink data of the second S-cell to the second S-cell, and wherein the information for demodulating the uplink data includes an uplink channel or transmission period information of a signal, offset information and sequence information.

3. The method of claim 1, further comprising:

transmitting, by the base station of the P-cell, information on a system frequency or a cell configuration for a group index identifier of the second S-cell to the wireless device when the system frequency of the second S-cell or the cell configuration information of the second S-cell is different from the first S-cell, wherein activating the second S-cell further comprises transmitting the group index identifier of the second S-cell to the wireless device by the base station of the P-cell, if the system frequency of the second S-cell or the cell configuration information is different from the first S-cell, and wherein the group index identifier is information for distinguishing an S-cell included in the S-cell group by the wireless device.

4. The method of claim 3, wherein the cell configuration information includes information on a carrier type, information on a transmission period of a primary synchronization signal (PSS) or a secondary synchronization signal (SSS) transmitted to the second S-cell, and transmission offset information.

5. A base station of a primary (P)-cell that performs cell switching in a wireless communication system, the base station comprising:

a processor; and a radio frequency (RF) unit, wherein the processor is configured to:

activate a first secondary (S)-cell, receive channel state information from a second S-cell, determine the second S-cell as a switching S-cell based on the channel state information, deactivate the first S-cell and activate the second S-cell, and configure a transmission of a switching random access preamble as uplink data transmitted to the first S-cell by a wireless device, wherein the switching random access preamble is configured to be transmitted by the wireless device in order to perform the cell switching of the base station of the P-cell, wherein the wireless device determines whether to perform the cell switching based on the switching random access preamble, wherein the first S-cell and the second S-cell are included in an S-cell group, wherein the S-cell group is a set of a plurality of S-cells for which an identical physical cell identifier is configured and operated based on an identical center frequency, wherein the channel state information includes information of a channel which is obtained by overhearing the uplink data that the wireless device transmits to the first S-cell by the second S-cell, wherein the P-cell, the first S-cell and the second S-cell are aggregated by a carrier aggregation, and wherein the first S-cell and the second S-cell are cells activated by the P-cell.

6. The base station of claim 5, wherein the first S-cell transmits information for demodulating the uplink data of the second S-cell to the second S-cell, and wherein the information for demodulating the uplink data includes an uplink channel or transmission period information of a signal, offset information and sequence information.

7. The base station of claim 5, wherein the processor is further configured to:

transmit information on a system frequency or a cell configuration for a group index identifier of the second S-cell to the wireless device when the system frequency of the second S-cell or the cell configuration information of the second S-cell is different from the first S-cell, and transmit the group index identifier of the second S-cell for activating the second S-cell to the wireless device, if the system frequency of the second S-cell or the cell configuration information is different from the first S-cell, and wherein the group index identifier is information for distinguishing an S-cell included in the S-cell group by the wireless device.

8. The base station of claim 7, wherein the cell configuration information includes information on a carrier type, information on a transmission period of a primary synchronization signal (PSS) or a secondary synchronization signal (SSS) transmitted to the second S-cell, and transmission offset information.

* * * * *